United States Patent
Watanabe et al.

(10) Patent No.: US 7,369,469 B2
(45) Date of Patent: May 6, 2008

(54) LASER POWER CONTROL APPARATUS AND METHOD, AN OPTICAL DISK APPARATUS AND A RECORDING METHOD

(75) Inventors: Katsuya Watanabe, Nara (JP); Yuu Okada, Osaka (JP); Mamoru Shoji, Osaka (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 561 days.

(21) Appl. No.: 10/931,696

(22) Filed: Sep. 1, 2004

(65) Prior Publication Data
US 2005/0047317 A1 Mar. 3, 2005

(30) Foreign Application Priority Data
Sep. 2, 2003 (JP) ............................. 2003-309790

(51) Int. Cl.
*G11B 5/09* (2006.01)
(52) U.S. Cl. .................... 369/47.5; 369/116; 369/94
(58) Field of Classification Search .................... None
See application file for complete search history.

(56) References Cited
U.S. PATENT DOCUMENTS
5,608,715 A * 3/1997 Yokogawa et al. ...... 369/275.1
6,049,521 A * 4/2000 Aratani ........................ 369/280
6,667,947 B2 * 12/2003 Maeda et al. ............. 369/275.1
6,865,147 B2 * 3/2005 Hosokawa ................... 369/288
2004/0085874 A1 * 5/2004 Akiyama et al. ......... 369/47.53
2005/0226116 A1 * 10/2005 Kubo et al. .............. 369/47.53

FOREIGN PATENT DOCUMENTS
JP 2000-311346 11/2000

* cited by examiner

*Primary Examiner*—Thang V. Tran
*Assistant Examiner*—Adam R. Giesy
(74) *Attorney, Agent, or Firm*—Renner, Otto, Boisselle & Sklar, LLP

(57) ABSTRACT

A laser power control apparatus is for use in an optical disk apparatus for recording information on an optical disk having at least a first layer and a second layer. The laser power control apparatus includes a power control section for controlling a laser element such that a power of a laser beam approaches a control target level; a change detection section for detecting that a recording condition for the optical disk has been changed; and a power adjustment section for adjusting the power of the laser beam for a recording film of the first layer, in accordance with an output from the change detection section. The power adjustment section determines the power of the laser beam for a recording film of the second layer, based on the power of the laser beam which has been adjusted for the recording film of the first layer.

15 Claims, 17 Drawing Sheets

FIG.3B

Inter-layer correction table

| 1st layer = reference layer ||
|---|---|
| 2nd layer | F2 (Pw1) |
| 3rd layer | F3 (Pw1) |
| ⋮ | ⋮ |

*FIG. 4B*

Temperature correction table

| Temperature | Temperature correction coefficient $K_T$ |
|---|---|
| X0°C | 1.00 (100%) |
| X1°C | 1.01 (101%) |
| X2°C | 0.97 (97%) |
| ⋮ | ⋮ |

*FIG. 7B*

Tilt correction table

| Tilt | Tilt correction coefficient Kc |
|---|---|
| Y0°C | 1.00 (100%) |
| Y1°C | 1.03 (103%) |
| Y2°C | 0.99 (99%) |
| ⋮ | ⋮ |

FIG.10B

Spherical aberration correction table

| Spherical aberration | Spherical aberration correction coefficient Ks |
|---|---|
| Z0 μm | 1.00 (100%) |
| Z1 μm | 1.02 (102%) |
| Z2 μm | 0.98 (98%) |
| ⋮ | ⋮ |

LASER POWER CONTROL APPARATUS AND METHOD, AN OPTICAL DISK APPARATUS AND A RECORDING METHOD

BACKGROUND OF THE INVENTION

1. Field of the Invention

The present invention relates to a laser power control apparatus and method for use in an optical disk apparatus for recording information onto an optical disk having a plurality of layers, an optical disk apparatus for recording information onto the optical disk and a recording method for recording information onto the optical disk.

2. Description of the Related Art

As the conventional method for adjusting a power of a laser beam of an optical disk apparatus, a known method includes the steps of adjusting a power of the laser beam according to the temperature and the position along the radial direction of the optical disk, and generating a data table of the power of the laser beam.

For example, the Japanese laid-open publication No. 1-112551 describes a method for determining a power of the laser beam using the data table. This conventional technique will be described with reference to FIG. 12.

FIG. 12 is a block diagram showing a configuration of a conventional optical disk apparatus for recording information onto an optical disk 1.

The optical disk 1 includes a single layer 1a. A recording film is provided for the layer 1a.

The optical pickup 10 converges the laser beam onto the recording film of the layer 1a.

A part of the laser beam emitted from the laser element 12 is transmitted through the reflection plate 15 and is detected by the emitting light detector 13.

Further, the laser beam emitted from the laser element 12 is reflected by the reflection plate 15, is transmitted through the deflection hologram 16, and is converged onto the recording film of the optical disk 1 by the convergence lens 11.

The laser beam (the reflected light) reflected by the recording film of the optical disk 1 is transmitted through the convergence lens 11, is deflected by the deflection hologram 16, is transmitted through the reflection plate 15 and is detected by the reflected light detector 14.

The laser beam detected by the emitting light detector 13 is analog-to-digital converted by the AD converter 31 included in the DSP (Digital Signal Processor) 30. The output from the AD converter 31 is supplied to the power control section 32 included in the DSP 30.

The power control section 32 generates a laser driving value such that a power of the laser beam detected by the emitting light detector 13 approaches a control target level, and controls the laser element 12 in accordance with the laser driving value.

Such a control is achieved, for example, by the DA converter 33 included in the DSP 30, which digital-to-analog converts the laser driving value generated by the power control section 32, and supplies the output from the DA converter 33 to the driving circuit 2. The control target level is determined by the power adjustment section 43 and is set in the power control section 32.

The driving circuit 2 drives the laser element 12 in accordance with the output from the DA converter 33.

The laser beam detected by the reflected light detector 14 (i.e. reflected light) is analog-to-digital converted by the AD converter 41 included in the DSP 30. The output from the AD converter 41 is supplied to the asymmetry detection section 42 included in the DSP 30.

The asymmetry detection section 42 detects asymmetry of the reflected light (Ipk+Ibm−2Iavg)/(Ipk−Ibm) from the peak level Ipk, the bottom level Ibm and the average level Iavg, and outputs a signal indicating the asymmetry of the reflected light to the power adjustment section 43.

The power adjustment section 43 searches an optimal value of the power of the laser beam such that the asymmetry of the reflected light becomes a desired value (e.g. "0").

With reference to FIG. 13, it will be described below the steps of the method for adjusting the power of the laser beam.

The power adjustment is made for the recording film of the optical disk 1 (S1).

Such a power adjustment is made, for example, by the power control section 32 controlling the laser element 12 such that the laser beam having the power according to a predetermined control target level is irradiated towards the optical disk 1 and by the power adjustment section 43 adjusting the control target level such that the asymmetry of the reflected light from the optical disk 1 becomes a desired value (e.g. "0"). The control target level which has been adjusted by the power adjustment section 43 is set in the power control section 32.

The power adjustment section 43 updates a table value for the current temperature with the control target level which has been adjusted by the power adjustment section 43 (S2).

It is determined whether the temperature has been changed (S3). The output of the temperature detector 17 is analog-to-digital converted by the AD converter 45 included in the DSP 30. The output of the AD converter 45 is supplied to the power adjustment section 43. The power adjustment section 43 determines whether the temperature has been changed by monitoring the output of the AD converter 45, for example.

If it is determined that the temperature has been changed, then it is determined whether the control target level has been adjusted for the current temperature (S4). The power adjustment section 43 determines whether the control target level has been adjusted by retrieving the contents of the RAM 44, for example.

If it is determined that the control target level has been adjusted, then the power adjustment section 43 reads the control target level corresponding to the current temperature from the table stored in the RAM 44 (S5), and sets the control target level in the power control section 32 (S6).

If it is determined that the control target level has not been adjusted, then the step to be processed is returned back to step S1.

According to the method for adjusting the power of the laser beam mentioned above, it is possible to adjust the power of the laser beam for recording so that a reproduced signal is obtained such that the asymmetry of the reflected light becomes a desired value (e.g. "0"), when the power of the laser beam emitted from the laser element is changed due to the changes in temperature which are caused by the temperature of the environment where the optical disk apparatus is used or the heat generated during the operation of the optical disk apparatus.

However, according to the conventional recording method, in the case where the optical disk has a plurality of layers (e.g. two layers) with information recording films, it is impossible to record information onto the recording film of any layer other than the reference layer of the optical disk at the optimal laser power, when the temperature of the environment where the optical disk apparatus is used has been changed.

Specifically, even if a data table for one layer (i.e. the reference layer) is generated and stored in response to the changes in temperature, it is impossible to generate a data table for any layer other than the reference layer.

In order to generate the data table for a layer other than the reference layer, it is necessary to make a power adjustment to the layer other than the reference layer, after making a power adjustment to the reference layer. It requires time for moving between two layers and time for making the power adjustment to the layer other than the reference layer by recording/reproducing data, resulting in taking twice, or more, of the time in making a power adjustment.

In order to continuously record moving pictures onto the optical disk, it is necessary to record them at a predetermined transfer rate. Accordingly, during a time period when a power adjustment is made while the recording operation is temporally stopped the data for the moving pictures must be stored in the DRAM. Taking twice, or more, of the time in making a power adjustment leads to taking twice, or more, of the capacity of the DRAM, which results in increasing the cost of the optical disk apparatus.

SUMMARY OF THE INVENTION

According to one aspect of the invention, a laser power control apparatus for use in an optical disk apparatus for recording information on an optical disk having at least a first layer and a second layer is provided. The laser power control apparatus includes a power control section for controlling a laser element such that a power of a laser beam approaches a control target level; a change detection section for detecting that a recording condition for the optical disk has been changed; and a power adjustment section for adjusting the power of the laser beam for a recording film of the first layer, in accordance with an output from the change detection section, wherein the power adjustment section determines the power of the laser beam for a recording film of the second layer, based on the power of the laser beam which has been adjusted for the recording film of the first layer.

In one embodiment of the invention, the optical disk apparatus includes an optical pickup for irradiating the optical disk with the laser beam and a driving circuit for driving the optical pickup, the optical pickup includes the laser element and an emitting light detector for detecting the laser light emitted from the laser element, the power control section generates a laser driving value such that a power of the laser beam detected by the emitting light detector approaches the control target level, and controls the laser element in accordance with the laser driving value, and the power adjustment section adjusts the power of the laser beam for the recording film of the first layer by adjusting at least one of a level of the laser beam detected by the emitting light detector, the control target level and a level of the laser driving value.

In one embodiment of the invention, the power adjustment section determines the control target level for the recording film of the second layer, as a function of the control target level for the recording film of the first layer.

In one embodiment of the invention, the function is a ratio of the control target level for the recording film of the second layer to the control target level for the recording film of the first layer.

In one embodiment of the invention, the function is a linear function or a quadratic function.

In one embodiment of the invention, the function is recorded in a predetermined area of the optical disk.

In one embodiment of the invention, the optical disk further includes a third layer, the power adjustment section further determines the control target level for a recording film of the third layer, as a function of the control target level for the recording film of the first layer, the function used in determining the control target level for the recording film of the second layer is different from the function used in determining the control target level for the recording film of the third layer.

In one embodiment of the invention, the change detection section includes at least one of a temperature detection section for detecting a temperature, a tilt detection section for detecting a tilt between a normal direction of an information surface of the optical disk and an optical axis direction of the laser beam irradiated towards the optical disk, and aspherical aberration section for detecting a spherical aberration of the laser beam due to a thickness of a protection layer of the optical disk, the power adjusting section adjusts the power of the laser beam for the recording film of the first layer, based on at least one of an output from the temperature detection section, an output from the tilt detection section and an output from the spherical aberration section.

In one embodiment of the invention, the laser power control apparatus further includes an asymmetry detection section for detecting an asymmetry of the laser beam reflected by the optical disk, wherein the power adjustment section adjusts the power of the laser beam for the recording film of the first layer such that an output from the asymmetry detection section becomes a desired value.

In one embodiment of the invention, the laser power control apparatus further includes a modulation degree detection section for detecting a modulation degree of the laser beam reflected by the optical disk, wherein the power adjustment section adjusts the power of the laser beam for the recording film of the first layer such that an output from the modulation degree detection section becomes a desired value.

In one embodiment of the invention, the power control section controls the laser element in an initial adjustment of the power of the laser beam, such that the power of the laser beam approaches a control target level $Pw2'$ which is preset for the recording film of the second layer, the control target level $Pw2'$ is defined based on a control target level $Pw1$ which has been adjusted for the recording film of the first layer, a level of a reference power $Pw1''$ for the recording film of the first layer, and a level of a reference power $Pw21''$ for the recording film of the second layer, the reference power $Pw1''$ is recorded in a predetermined area of the optical disk, and the reference power $Pw2''$ is recorded in a predetermined area of the optical disk.

In one embodiment of the invention, the control target level $Pw2'$ is defined by the equation of $Pw2'=Pw1 \times Pw2''/Pw1''$.

According to one aspect of the invention, a laser power control method for use in an optical disk apparatus for recording information on an optical disk having at least a first layer and a second layer is provided. The laser power control method includes controlling a laser element such that a power of a laser beam approaches a control target level; detecting that a recording condition for the optical disk has been changed; adjusting the power of the laser beam for a recording film of the first layer, in accordance with the change of the recording condition; and determining the power of the laser beam for a recording film of the second layer, based on the power of the laser beam which has been adjusted for the recording film of the first layer.

According to one aspect of the invention, an optical disk apparatus for recording information onto an optical disk having at least a first layer and a second layer is provided. The optical disk apparatus includes an optical pickup for irradiating the optical disk with a laser beam; a driving circuit for driving the optical pick up; and a laser power control apparatus for controlling a power of the laser beam, wherein the laser power control apparatus includes a power control section for controlling a laser element such that the power of the laser beam approaches a control target level; a change detection section for detecting that a recording condition for the optical disk has been changed; and a power adjustment section for adjusting the power of the laser beam for a recording film of the first layer, in accordance with an output from the change detection section, and wherein the power adjustment section determines the power of the laser beam for a recording film of the second layer, based on the power of the laser beam which has been adjusted for the recording film of the first layer.

According to one aspect of the invention, a recording method for recording information onto an optical disk having at least a first layer and a second layer is provided. The recording method including irradiating the optical disk with a laser beam; and controlling a power of the laser beam, wherein the controlling the power of the laser beam includes controlling a laser element such that the power of the laser beam approaches a control target level; detecting that a recording condition for the optical disk has been changed; adjusting the power of the laser beam for a recording film of the first layer, in accordance with the change of the recording condition; and determining the power of the laser beam for a recording film of the second layer, based on the power of the laser beam which has been adjusted for the recording film of the first layer.

Thus, the invention described herein makes possible the advantages of providing a laser control apparatus and method capable of determining a power of the laser beam for a recording film of a second layer of the optical disk, based on a power of the laser beam which has been adjusted for the recording film of a first layer of the optical disk.

These and other advantages of the present invention will become apparent to those skilled in the art upon reading and understanding the following detailed description with reference to the accompanying figures.

BRIEF DESCRIPTION OF THE DRAWINGS

FIG. 3B is a diagram showing an example of the interlayer correction table.

FIG. 4B is a diagram showing an example of the temperature correction table.

FIG. 7B is a diagram showing an example of the tilt correction table.

FIG. 10B is a diagram showing an example of the spherical aberration correction table.

DESCRIPTION OF THE PREFERRED EMBODIMENTS

Hereinafter, the embodiments of the present invention will be described with reference to the figures.

Embodiment 1

Figure 1:
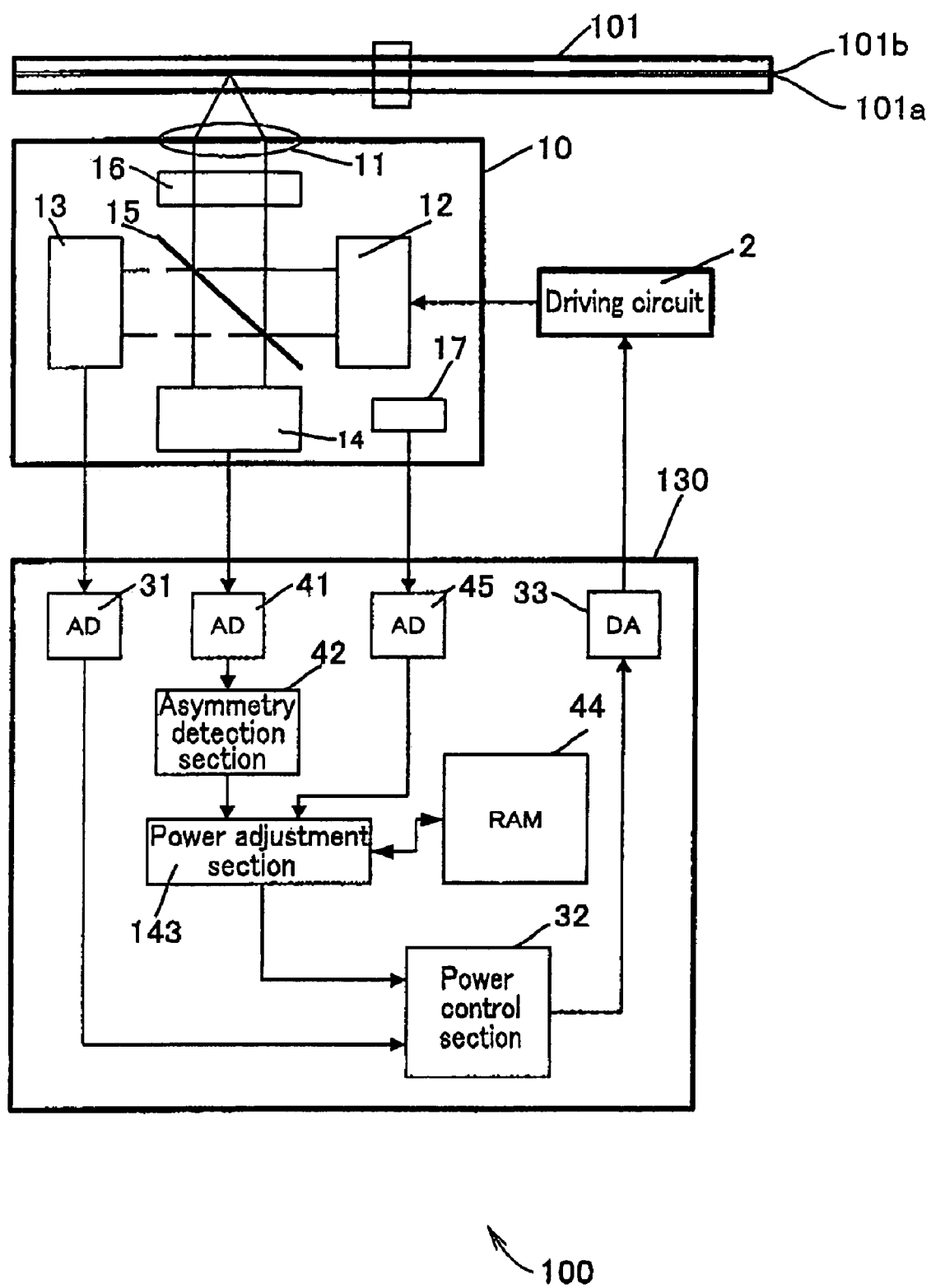
FIG. 1 is a block diagram showing a configuration of an optical disk apparatus according to embodiment 1 of the invention.

FIG. 1 is a block diagram showing a configuration of an optical disk apparatus 100 for recording information onto an optical disk 101.

The optical disk apparatus 100 includes an optical pickup 10 for irradiating the optical disk with a laser beam and a DSP (Digital Signal Processor) 130. The DSP 130 functions as a laser power control apparatus for controlling a power of the laser beam.

The optical disk 101 includes a first layer 101a and a second layer 101b. A recording film is provided for each of the first layer 101a and the second layer 101b. The optical disk 101 may include N number of layers, wherein N is an integer equal to or greater than three. One layer among the N number of layers is used as a reference layer.

The operation of the optical disk apparatus 100 will be described below.

The optical pickup 10 converges the laser beam onto the recording film of the first layer 101a, or converges the laser beam onto the recording film of the second layer 101b.

A part of the laser beam emitted from the laser element 12 is transmitted through the reflection plate 15 and is detected by the emitting light detector 13.

Further, the laser beam emitted from the laser element 12 is reflected by the reflection plate 15, is transmitted through the deflection hologram 16, and is converged onto the recording film. (the recording film of the first layer 101a or the recording film of the second layer 101b) of the optical disk 101 by the convergence lens 11.

The laser beam (the reflected light) reflected by the recording film of the optical disk 101 is transmitted through the convergence lens 11, is deflected by the deflection hologram 16, is transmitted through the reflection plate 15 and is detected by the reflected light detector 14.

The laser beam detected by the emitting light detector 13 is analog-to-digital converted by the AD converter 31 included in the DSP 130. The output from the AD converter 31 is supplied to the power control section 32 included in the DSP 130.

The power control section 32 generates a laser driving value such that a power of the laser beam detected by the emitting light detector 13 approaches a control target level, and controls the laser element 12 in accordance with the laser driving value.

Such a control is achieved, for example, by the DA converter 33 included in the DSP 130, which digital-to-analog converts the laser driving value generated by the power control section 32, and supplies the output from the DA converter 33 to the driving circuit 2. The control target level is determined by the power adjustment section 143 and is set in the power control section 32.

The driving circuit 2 drives the laser element 12 in accordance with the output from the DA converter 33.

The laser beam detected by the reflected light detector 14 (i.e. reflected light) is analog-to-digital converted by the AD converter 41 included in the DSP 130. The output from the AD converter 41 is supplied to the asymmetry detection section 42 included in the DSP 130.

The asymmetry detection section 42 detects asymmetry of the reflected light $(I_{pk}+I_{bm}-2I_{avg})/(I_{pk}-I_{bm})$ from the peak level $I_{pk}$, the bottom level $I_{bm}$ and the average level $I_{avg}$, and outputs a signal indicating the asymmetry of the reflected light to the power adjustment section 143.

Figure 2:
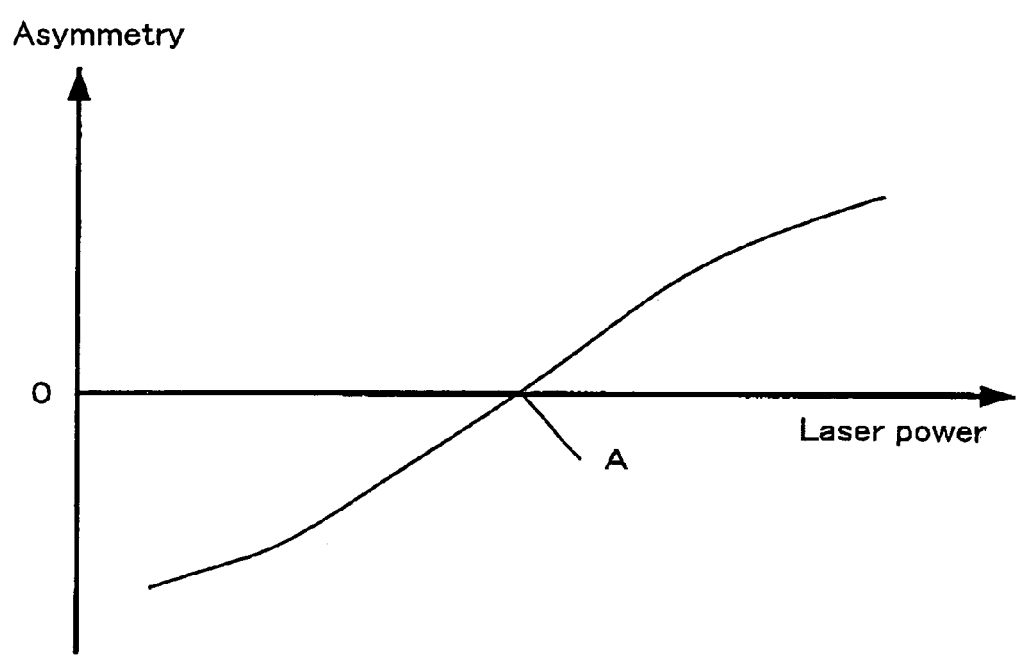
FIG. 2 is a characteristic diagram showing a relationship between the power of the laser beam and the asymmetry of the reflected light.

FIG. 2 is a characteristic diagram showing a relationship between the power of the laser beam and the asymmetry of the reflected light. In FIG. 2, the horizontal axis indicates the power of the laser beam, and the vertical axis indicates the asymmetry of the reflected light.

The power adjustment section 143 searches an optimal value of the power of the laser beam such that the asymmetry of the reflected light becomes a desired value (e.g. "0") as in point "A" shown in FIG. 2.

Such a search can be achieved, for example, by irradiating the optical disk 101 with the two laser beams with the respective certain powers, detecting the asymmetry of the reflected light from the optical disk 101, making a linear approximation to the asymmetry of the reflected light, and obtaining a power of the laser beam such that the asymmetry of the reflected light becomes a desired value (e.g. "0"). The power adjustment section 143 outputs the optimal value of the power of the laser beam to the power control section 32 as the control target level.

Further, the power adjustment section 143 adjusts the power of the laser beam for the recording layer of the first layer 101a (i.e. the reference layer) in accordance with the output from the temperature detector 17.

The method for adjusting the power of the laser beam will be described below. This method is performed, for example, by operating the optical disk apparatus 100.

First, with reference to FIG. 3A, it will be described below the steps of the method for adjusting the power of the laser beam in the case where the power of the laser beam is adjusted before recording data onto the optical disk 101 is started (i.e. in the case of "initial adjustment").

The power adjustment is made for the first layer 101a of the optical disk 101 (S101).

Such a power adjustment is made, for example, by the power control section 32 controlling the laser element 12 such that the laser beam having the power according to the control target level Pw1', which is preset for the recording film of the first layer 101a, is irradiated towards the optical disk 101, and by the power adjustment section 143 adjusting the control target level for the recording film of the first layer 101a such that the asymmetry of the reflected light from the optical disk 101 becomes a desired value (e.g. "0"). The control target level which has been adjusted by the power adjustment section 143 is set in the power control section 32 as a control target level Pw1 for the recording film of the first layer 101a.

The control target level Pw1' which is preset for the recording film of the first layer 101a may be a level of a reference power Pw1" for the recording film of the first layer 101a which is set in firmware executed by the DSP 130, or may be a level of a reference power Pw1' for the recording film of the first layer 101a which is recorded in a predetermined area (e.g. a predetermined area within the lead-in area) of the optical disk 101.

The recording film to be recorded is moved from the recording film of the first layer 101a to the recording film of the second layer 101b (S102).

The power adjustment is made for the second layer 101b of the optical disk 101 (S103).

Such a power adjustment is made, for example, by the power control section 32 controlling the laser element 12 such that the laser beam having the power according to the control target level Pw2', which is preset for the recording film of the second layer 101b, is irradiated towards the optical disk 101, and by the power adjustment section 143 adjusting the control target level for the recording film of the second layer 101b such that the asymmetry of the reflected light from the optical disk 101 becomes a desired value (e.g. "0"). The control target level which has been adjusted by the power adjustment section 143 is set in the power control section 32 as a control target level Pw2 for the recording film of the second layer 101b.

The control target level Pw2' which is preset for the recording film of the second layer 101b may be the control target level Pw1 which has been adjusted in step S101, or may be a level of a reference power Pw2" for the recording film of the second layer 101b which is recorded in a predetermined area (e.g. a predetermined area within the lead-in area) of the optical disk 101.

Alternatively, the control target level Pw2' may be calculated according to the equation of Pw2'=Pw1×Pw2"/Pw1". The ratio Pw2"/Pw1" may be a ratio which is recorded in a predetermined area (e.g. a predetermined area within the lead-in area) of the optical disk 101.

Alternatively, the power adjustment section 143 may set the control target level Pw2' (=Pw1×Pw2"/Pw1") in the power control section 32 as the control target level Pw2, without making any adjustment to the control target level for the recording film of the second layer 101b.

The information (for example, the information in a table form) stored in the RAM 44 is updated (B104).

Such an update can be made, for example, by writing the control targets level Pw1 for the recording film of the first layer 101a, and the ratio of the control target level Pw2 for the recoding film of the second layer 101b to the control target level Pw1 for the recording film of the first layer 101a (i.e. the ratio Pw2/Pw1), into the RAM 44. Any rewritable memory can be used instead of the RAM 44.

Instead of writing the ratio Pw2/Pw1 into the RAM 44, it is possible to write a function of Pw1 into the RAM 44. The function is, for example, a linear function or a quadratic function.

The power adjustment section 143 may determine the control target level Pw2 for the recording film of the second layer 101b as a function of the control target level Pw1 for the recording film of the first layer 101a. The function of Pw1 is stored, for example, in an inter-layer correction table of RAM 44.

FIG. 3B shows an example of the inter-layer correction table. In this example, the table indicates that the function F2(Pw1) is used to determine the control target level Pw2 for the recording film of the second layer, and that the function F3(Pw1) is used to determine the control target level Pw3 for the recording film of the third layer. The function F2(Pw1) and the function F3(Pw1) may be the same or may be different from each other.

Figure 4A:
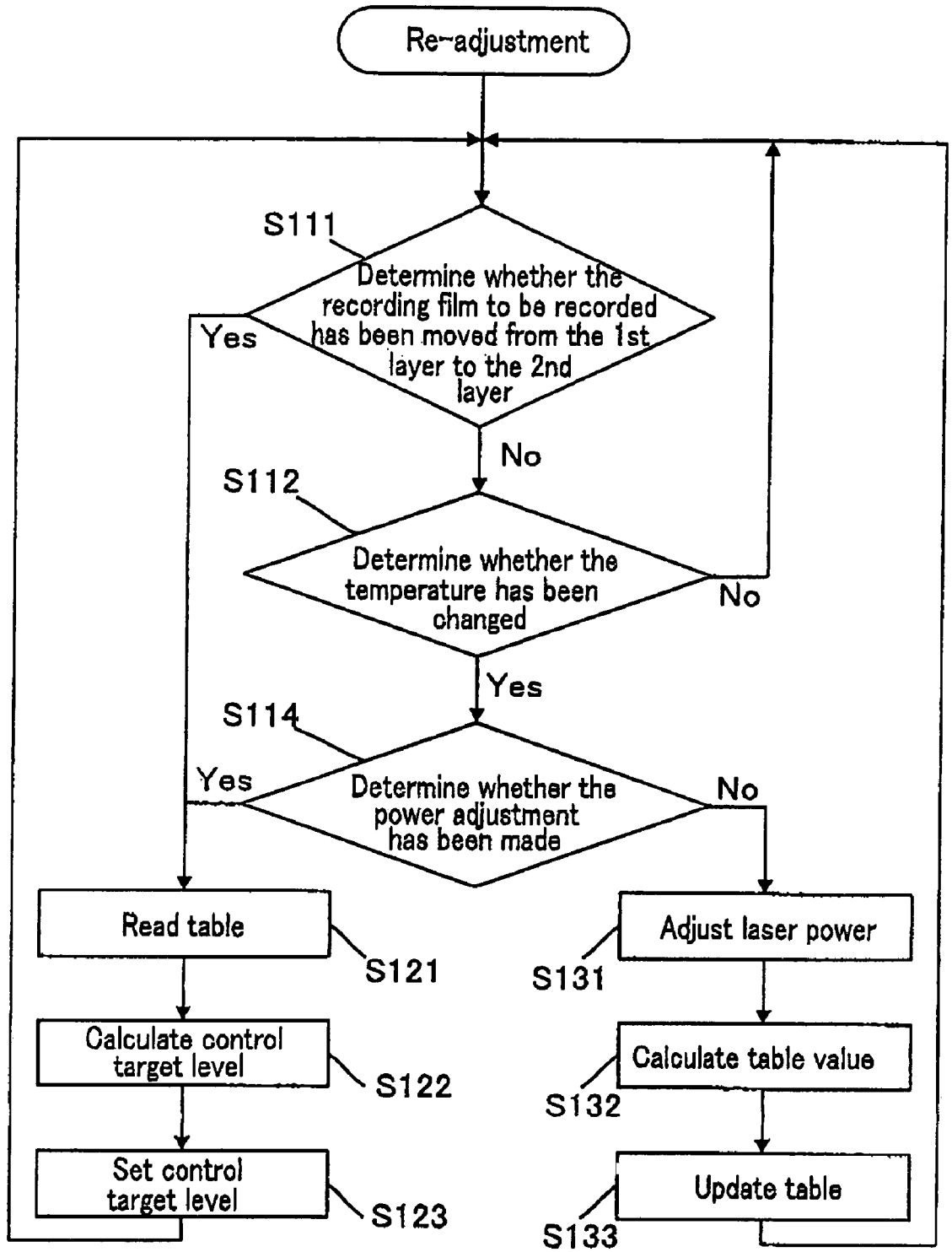
FIG. 4A is a flowchart showing the steps of the method for adjusting the power of the laser beam in the case of the re-adjustment according to embodiment 1 of the invention.

Next, with reference to FIG. 4A, it will be described below, the steps of the method for adjusting the power of the laser beam in the case where the power of the laser beam is adjusted during recording data onto the optical disk 101 due to the changes in temperature and the like, after the initial adjustment (i.e. in the case of "re-adjustment").

It is determined whether the recording film to be recorded has been moved from the recording film of the first layer 101a (the reference layer) to the recording film of the second layer 101b (S111).

If it is determined that the recording film to be recorded has been moved from the recording film of the first layer 101a to the recording film of the second layer 101b, then the power adjustment section 143 reads the ratio Pw2/Pw1 and the current control target level Pw1t for the recording film of the first layer 101a from the table stored in the RAM 44 (S121), calculates the current control target level Pw2t for the recording film of the second layer 101b according to the equation of Pw2t=Pw1t×Pw2/Pw1 (S122), and sets the current control target level Pw2t for the recording film of the second layer 101b which has been calculated in step S122 in the power control section 32 (S123).

When the function of Pw1 (for example, F2(Pw1)) is stored in the RAM 44 instead of the ratio Pw2/Pw1, the power adjustment section 143 reads the function F2(Pw1) and the current control target level Pw1t for the recording film of the first layer 101a from the table stored in the RAM 44 (S121), and calculates the current control target level Pw2t for the recording film of the second layer 101b according to the equation of Pw2t=F2(Pw1t) (S122).

The current control target level Pw1t for the recording film of the first layer 101a is calculated for the purpose of compensating the changes in the control target level Pw1 due to the changes in temperature.

For example, it is assumed that the control target level Pw1 is a control target level at the reference temperature X0° C., the temperature is changed from X0° C. to X1° C., and the temperature correction coefficient $K_T$(X1° C.) for the current temperature X1° C. is set to 1.01 (101%). In this case, the current control target level Pw1t is calculated according to the equation of Pw1t=Pw1×$K_T$(X1° C.)=1.01 Pw1.

The temperature correction coefficient $K_T$ can be stored in the temperature correction table of RAM 44 as a power rate relative to the reference temperature of the reference layer, for example.

FIG. 4B shows an example of the temperature correction table. In this example, the table indicates that $K_T$(X1° C.)=1.01 (101%) and $K_T$(X2° C.)=0.97 (97%), both for the reference temperature X0° C.

The power adjustment section 143 can read the ratio Pw2/Pw1 which is recorded in a predetermined area (e.g. a predetermined area within the lead-in area) of the optical disk 101, instead of reading the ratio Pw2/Pw1 from the table stored in the RAM 44.

Alternatively, the power adjustment section 143 can read the function of Pw1 (e.g. F2(Pw1)) which is recorded in a predetermined area (e.g. a predetermined area within the lead-in area) of the optical disk 101, instead of reading the function of Pw1 from the table stored in the RAM 44.

Thus, the power adjustment section 143 determines the power of the laser beam for the recording film of the second layer 101b, based on the power of the laser beam which has been adjusted for the recording film of the first layer 101a.

It is determined whether the temperature has been changed (S112). The output of the temperature detector 17 is analog-to-digital converted by the AD converter 45 included in the DSP 130. The output of the AD converter 45 is supplied to the power adjustment section 143. The power adjustment section 143 determines whether the temperature has been changed by monitoring the output of the AD converter 45, for example.

If it is determined that the temperature has been changed, then it is determined whether the power of the laser beam for the recording film of the first layer 101a has been adjusted for the current temperature (S114).

Such a determination is made, for example, by determining whether the control target level Pw1 for the recording film of the first layer 101a has been adjusted for the current temperature (i.e. determining whether the current control target level Pw1t for the current temperature (or the temperature correction coefficient $K_T$ for the current temperature) is stored in the RAM 44). The power adjustment section 143 determines whether the control target level Pw1 has been adjusted by retrieving the contents of the RAM 44, for example.

If it is determined that the power of the laser beam for the recording film of the first layer 101a has been adjusted, then the steps S121, S122 and S123 as described above are executed.

Figure 3A:
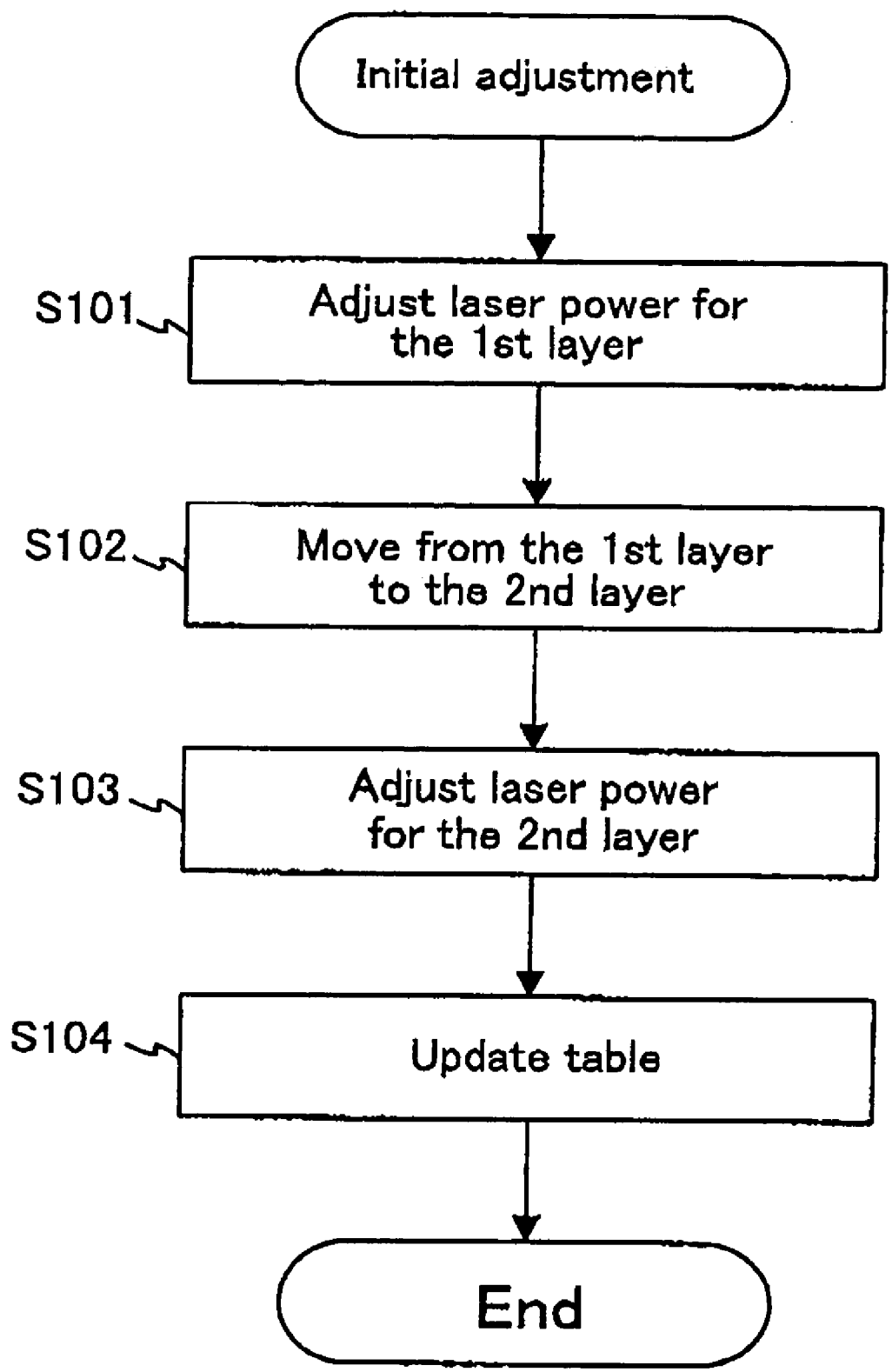
FIG. 3A is a flowchart showing the steps of the method for adjusting the power of the laser beam in the case of the initial adjustment according to embodiment 1 of the invention.

If it is determined that the power of the laser beam for the recording film of the first layer 101a has not been adjusted, then the power adjustment is made for the first layer 101a in a similar way as step S101 shown in FIG. 3A (S131).

Such a power adjustment is made, for example, by the power control section 32 controlling the laser element 12 such that the laser beam having the power according to the control target level Pw1', which is preset for the recording film of the first layer 101a, is irradiated towards the optical disk 101, and by the power adjustment section 143 adjusting the control target level for the recording film of the first layer 101a such that the asymmetry of the reflected light from the optical disk 101 becomes a desired value (e.g. "0").

The power adjustment section 143 calculates a value to be stored in the table of the RAM 44 (S132), and updates the table of the RAM 44 using the calculated value (S133).

For example, the power adjustment section 143 may store a set of the current temperature and the control target level which has been adjusted by the power adjustment section 143 (i.e the control target level for the current temperature) in the RAM 44.

Alternatively, the power adjustment section 143 may calculate the temperature correction coefficient $K_T$ for the current temperature from the control target level at the reference temperature and the control target level which has been adjusted by the power adjustment section 143 (i.e. the control target level for the current temperature), and store a set of the current temperature and the temperature correction coefficient $K_T$ in the RAM 44.

According to the method for adjusting the power of the laser beam mentioned above, by storing table data indicating the power of the laser beam which has been adjusted for each temperature in the RAM 44 included in the DSP 130, the control target level of the power control section 32 can be set based on the table data stored in the RAM 44 without recording/reproducing data, when the table data corresponding to the current temperature exists in the RAM 44.

Further, for an optical disk having a plurality of layers, the control target level for the recording film of each layer other than the reference layer can be set based on a ratio of the control target level for the recording layer for the corresponding layer other than the reference layer to the control target level for the recording film of the reference layer.

Alternatively, a function of the control target level for the recording film for the reference layer can be used instead of such a ratio. The function is, for example, a linear function or a quadratic function.

This enables, for the optical disk having a plurality of layers, to adjust the power of the laser beam for recording, so that a reproduced signal is obtained, such that the asymmetry of the reflected light becomes a desired value (e.g. "0") within the substantially same time required for an optical disk having a single layer, when the power of the laser beam emitted from the laser element is changed, due to the changes in temperature which are caused by the temperature of the environment where the optical disk apparatus is used or the heat generated during the operation of the optical disk apparatus.

Embodiment 2

Figure 5:
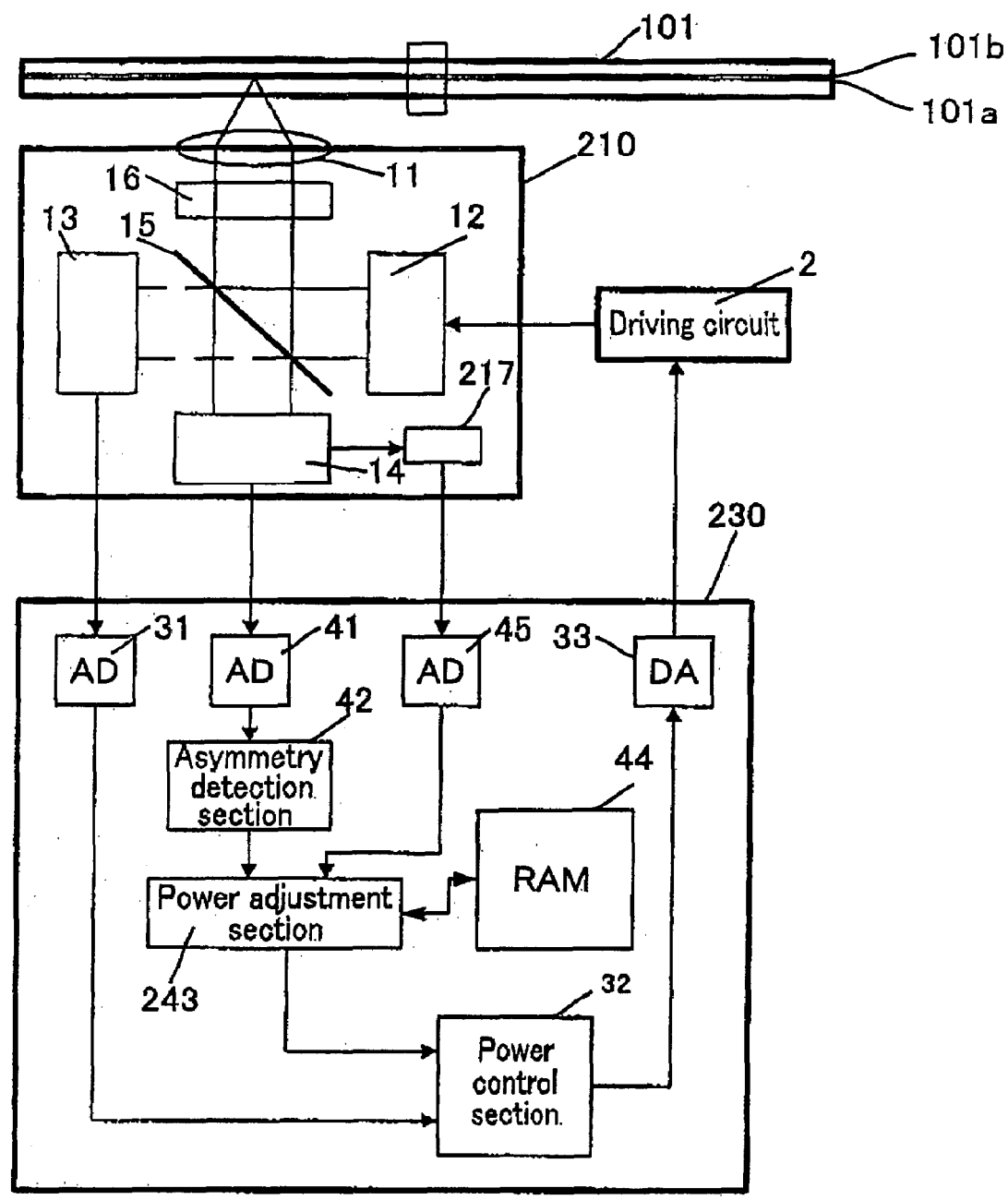
FIG. 5 is a block diagram showing a configuration of an optical disk apparatus according to embodiment 2 of the invention.

FIG. 5 is a block diagram showing a configuration of an optical disk apparatus 200 for recording information onto an optical disk 101.

The optical disk apparatus 200 includes an optical pickup 210 for irradiating the optical disk with a laser beam and a DSP (Digital Signal Processor) 230. The DSP 230 functions as a laser power control apparatus for controlling a power of the laser beam.

Since the optical disk 101 can be deformed to bend due to the changes in temperature, a tilt between a normal direction of an information surface of the optical disk 101 and an optical axis direction of the laser beam irradiated towards the optical disk 101 is changed according to the position along the radial direction of the optical disk 101. The change in tilt causes the change in effective power of the laser beam. The purpose of embodiment 2 of the invention is to adjust the effective power of the laser beam depending on the changes in tilt.

The operation of the optical disk apparatus 200 will be described below.

The optical pickup 210 converges the laser beam onto the recording film of the first layer 101a, or converges the laser beam onto the recording film of the second layer 101b.

A part of the laser beam emitted from the laser element 12 is transmitted through the reflection plate 15 and is detected by the emitting light detector 13.

Further, the laser beam emitted from the laser element 12 is reflected by the reflection plate 15, is transmitted through the deflection hologram 16, and is converged onto the recording film (the recording film of the first layer 101a or the recording film of the second layer 101b) of the optical disk 101 by the convergence lens 11.

The laser beam (the reflected light) reflected by the recording film of the optical disk 101 is transmitted through the convergence lens 11, is deflected by the deflection hologram 16, is transmitted through the reflection plate 15 and is detected by the reflected light detector 14.

The optical pickup 210 includes a tilt detector 217 for detecting a tilt based on the distribution of the reflected light detected by the reflected light detector 14.

The laser beam detected by the emitting light detector 13 is analog-to-digital converted by the AD converter 31 included in the DSP 230. The output from the AD converter 31 is supplied to the power control section 32 included in the DSP 230.

The power control section 32 generates a laser driving value such that a power of the laser beam detected by the emitting light detector 13 approaches a control target level, and controls the laser element 12 in accordance with the laser driving value.

Such a control is achieved, for example, by the DA converter 33 included in the DSP 230, which digital-to-analog converts the laser driving value generated by the power control section 32, and supplies the output from the DA converter 33 to the driving circuit 2. The control target level is determined by the power adjustment section 243 and is set in the power control section 32.

The driving circuit 2 drives the laser element 12 in accordance with the output from the DA converter 33.

The laser beam detected by the reflected light detector 14 (i.e. reflected light) is analog-to-digital converted by the AD converter 41 included in the DSP 230. The output from the AD converter 41 is supplied to the asymmetry detection section 42 included in the DSP 230.

The asymmetry detection section 42 detects asymmetry of the reflected light (Ipk+Ibm−2Iavg)/(Ipk−Ibm) from the peak level Ipk, the bottom level Ibm and the average level Iavg, and outputs a signal indicating the asymmetry of the reflected light to the power adjustment section 243.

The power adjustment section 243 searches an optimal value of the power of the laser beam such that the asymmetry of the reflected light becomes a desired value (e.g. "0"). The steps of this search method are the same as those described in embodiment 1 with reference to FIG. 2. Therefore, the detailed description is omitted herein.

The power adjustment section 243 outputs, the optimal value of the power of the laser beam to the power control section 32 as the control target level.

Further, the power adjustment section 243 adjusts the power of the laser beam for the recording layer of the first layer 101a(i.e. the reference layer) in accordance with the output from the tilt detector 217.

Figure 6:
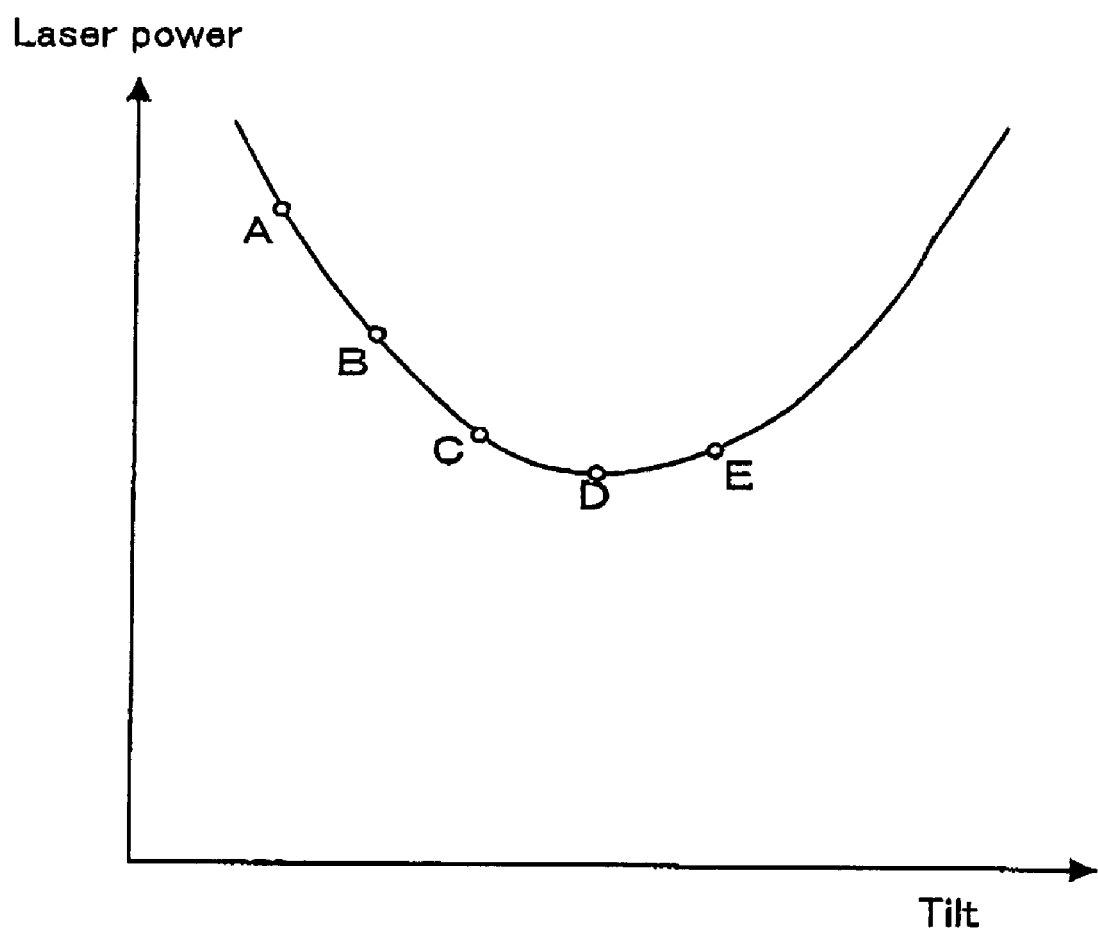
FIG. 6 is a characteristic diagram showing a relationship between the tilt and the power of the laser beam.

FIG. 6 is a characteristic diagram showing a relationship between the tilt and the power of the laser beam. In FIG. 6, the horizontal axis indicates the tilt, and the vertical axis indicates the power of the laser beam. As shown in FIG. 6, an optimal power of the laser beam is changed according to the tilt.

The power adjustment section 243 adjusts the power of the laser beam according to the tilt. For example, it is detected that the tilt is changed in the order of point "A", point "B", point "C", point "D" and point "E" shown in FIG. 6, and the power adjustment section 243 adjusts the power of laser beam for each of the points shown in FIG. 6. As a result, the control target level which has been adjusted by the power adjustment section 243 is stored in the table of RAM 44.

The method for adjusting the power of the laser beam will be described below. This method is performed, for example, by operating the optical disk apparatus 200.

The steps of the method for adjusting the power of the laser beam in the case where the power of the laser beam is adjusted before recording data onto the optical disk 101 is started (i.e. in the case of "initial adjustment") are the same as those described in embodiment 1 with reference to FIG. 3A. Therefore, the detailed description is omitted herein.

Figure 7A:
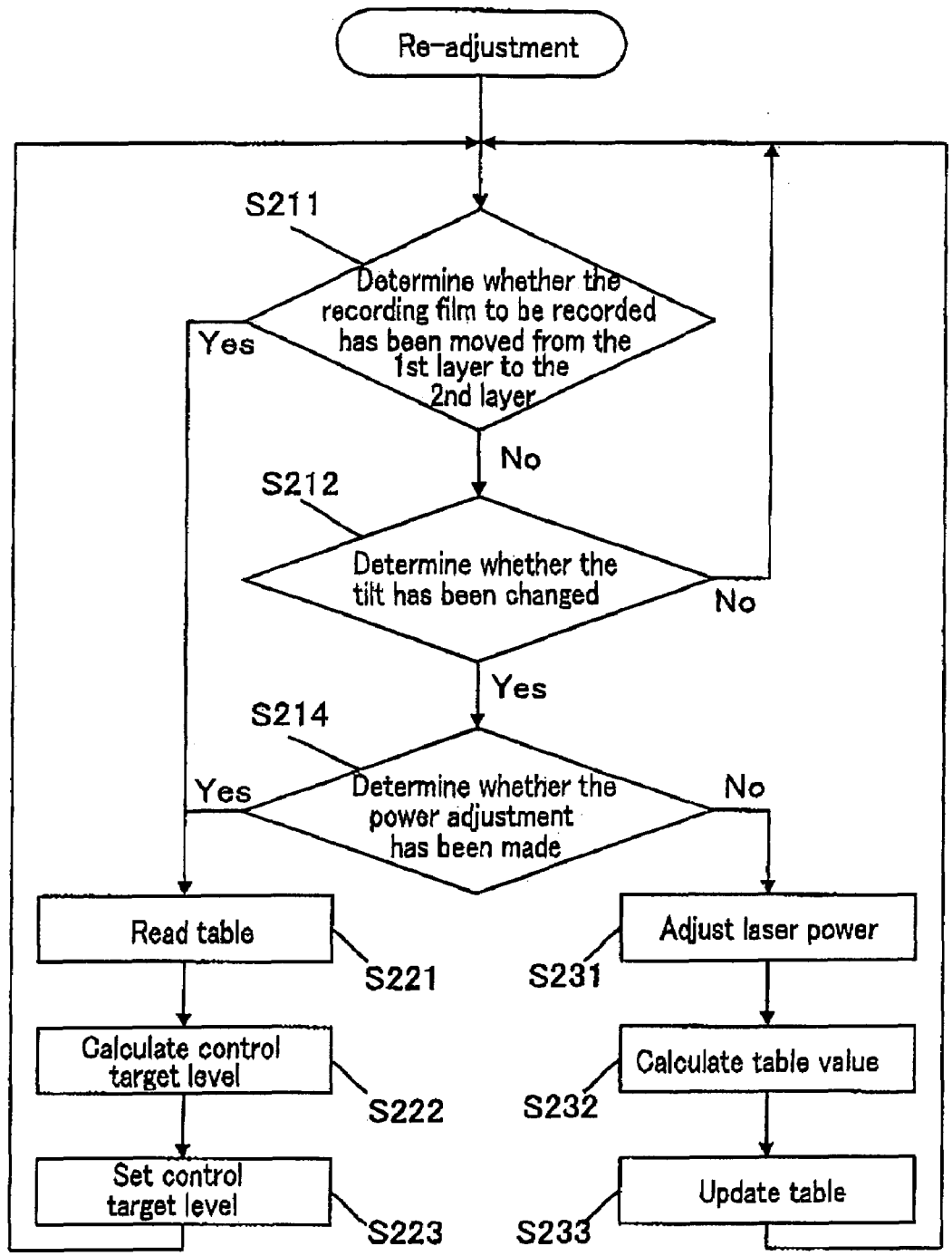
FIG. 7A is a flowchart showing the steps of the method for adjusting the power of the laser beam in the case of the re-adjustment according to embodiment 2 of the invention.

With reference to FIG. 7A, it will be described below, the steps of the method for adjusting the power of the laser beam in the case, where the power of the laser beam is adjusted during recording data onto the optical disk 101 due to the changes in tilt and the like, after the initial adjustment (i.e. in the case of "re-adjustment").

It is determined whether the recording film to be recorded has been moved from the recording film of the first layer 101a (the reference layer) to the recording film of the second layer 101b (S211).

If it is determined that the recording film to be recorded has been moved from the recording film of the first layer 101a to the recording film of the second layer 101b, then the power adjustment section 243 reads the ratio Pw2/Pw1 and the current control target level Pw1t for the recording film of the first layer 101a from the table stored in the RAM 44 (S221), calculates the current control target level Pw2t for the recording film of the second layer 101b according to the equation of Pw2t=Pw1t×Pw2/Pw1 (S222), and sets the current control target level Pw2t for the recording film of the second layer 101b which has been calculated in step S222 in the power control section 32 (S223).

When the function of Pw1, (for example, F2(Pw1)) is stored in the RAM 44 instead of the ratio Pw2/Pw1, the power adjustment section 243 reads the function F2(Pw1) and the current control target level Pw1t for the recording film of the first layer 101a from the table stored in the RAM 44 (S221), and calculates the current control target level Pw2t for the recording film of the second layer 101b according to the equation of Pw2t=F2(Pw1t) (S222).

The current control target level Pw1t for the recording film of the first layer 101a is calculated for the purpose of compensating the changes in the control target level Pw1 due to the changes in tilt.

For example, it is assumed that the control target level Pw1 is a control target level at the reference tilt Y0°, the tilt is changed from Y0° to Y1°, and the tilt correction coefficient $K_C$(Y1°) for the current temperature Y1° is set to 1.03 (103%) In this case, the current control target level Pw1t is calculated according to the equation of Pw1t=Pw1×$K_C$(Y1°)= 1.03 Pw1.

The tilt correction coefficient $K_C$ can be stored in the tilt correction table of RAM 44 as a power rate relative to the reference tilt of the reference layer, for example.

FIG. 7B shows an example of the tilt correction table. In this example, the table indicates that $K_C$(Y1°)=1.03 (103%) and $K_C$(Y2°)=0.99 (99%), both for the reference tilt Y0°.

The power adjustment section 243 can read the ratio Pw2/Pw1 which is recorded in a predetermined area (e.g. a predetermined area within the lead-in area) of the optical disk 101, instead of reading the ratio Pw2/Pw1 from the table stored in the RAM 44.

Alternatively, the power adjustment section 243 can read the function of Pw1 (e.g. F2(Pw1)) which is recorded in a predetermined area (e.g. a predetermined area Within the lead-in area) of the optical disk 101, instead of reading the function of Pw1 from the table stored in the RAM 44.

Thus, the power adjustment section 243 determines the power of the laser beam for the recording film of the second layer 101b, based on the power of the laser beam which has been adjusted for the recording film of the first layer 101a.

It is determined whether the tilt has been changed (S212). The output of the tilt detector 217 is analog-to-digital converted by the AD converter 45 included in the DSP 230. The output of the AD converter 45 is supplied to the power adjustment section 243. The power adjustment section 243 determines whether the tilt has been changed by monitoring the output of the AD converter 45, for example.

If it is determined that the tilt has been changed, then it is determined whether the power of the laser beam for the recording film of the first layer 101a has been adjusted for the current tilt (S214).

Such a determination is made, for example, by determining whether the control target level Pw1 for the recording film of the first layer 101a has been adjusted for the current tilt (i.e. determining whether the current control target level Pw1t for the current tilt (or the tilt correction coefficient $K_C$ for the current tilt) is stored in the RAM 44). The power adjustment section 243 determines whether the control target level Pw1 has been adjusted by retrieving the contents of the RAM 44, for example.

If it is determined that the power of the laser beam for the recording film of the first layer 101a has been adjusted, then the steps S221, S222 and S223 as described above are executed.

If it is determined that the power of the laser beam for the recording film of the first layer 101a has not been adjusted, then the power adjustment is made for the first layer 101a in a similar way as step S101 shown in FIG. 3A (S231).

Such a power adjustment is made, for example, by the power control section 32 controlling the laser element 12 such that the laser beam having the power according to the control target level Pw1', which is preset for the recording film of the first layer 101a, is irradiated towards the optical disk 101, and by the power adjustment section 243 adjusting the control target level for the recording film of the first layer 101a such that the asymmetry of the reflected light from the optical disk 101 becomes a desired value (e.g. "0").

The power adjustment section 243 calculates a value to be stored in the table of the RAM 44 (S232), and updates the table of the RAM 44 using the calculated value (S233).

For example, the power adjustment section 243 may store a set of the current tilt and the control target level which has been adjusted by the power adjustment section 243 (i.e. the control target level for the current tilt) in the RAM 44.

Alternatively, the power adjustment section 243 may calculate the tilt correction coefficient $K_C$ for the current tilt from the control target level at the reference tilt and the control target level which has been adjusted by the power adjustment section 243 (i.e. the control target level for the current tilt), and store a set of the current tilt and the tilt correction coefficient, $K_C$ in the RAM 44.

According to the method for adjusting the power of the laser beam mentioned above, by storing table data indicating the power of the laser beam which has been adjusted for each temperature in the RAM 44 included in the DSP 230, the control target level of the power control section 32 can be set based on the table data stored in the RAM 44 without recording/reproducing data, when the table data corresponding to the current tilt exists in the RAM 44.

Further, for an optical disk having a plurality of layers, the control target level for the recording film of each layer other than the reference layer can be set based on a ratio of the control target level for the recording layer for the corresponding layer other than the reference layer to the control target level for the recording film of the reference layer.

Alternatively, a function of the control target level for the recording film for the reference layer can be used instead of such a ratio. The function is, for example, a linear function or a quadratic function.

This enables, for the optical disk having a plurality of layers, to adjust the power of the laser beam for recording, so that a reproduced signal is obtained, such that the asymmetry of the reflected light becomes a desired value (e.g. "0") within the substantially same time required for an optical disk having a single layer, when the power of the laser beam emitted from the laser element is changed, due to the changes in tilt which are caused by the deformation of the optical disk 101. The deformation of the optical disk 101 may be caused by the temperature of the environment where the optical disk apparatus is used or the heat generated during the operation of the optical disk apparatus.

Embodiment 3

Figure 8:
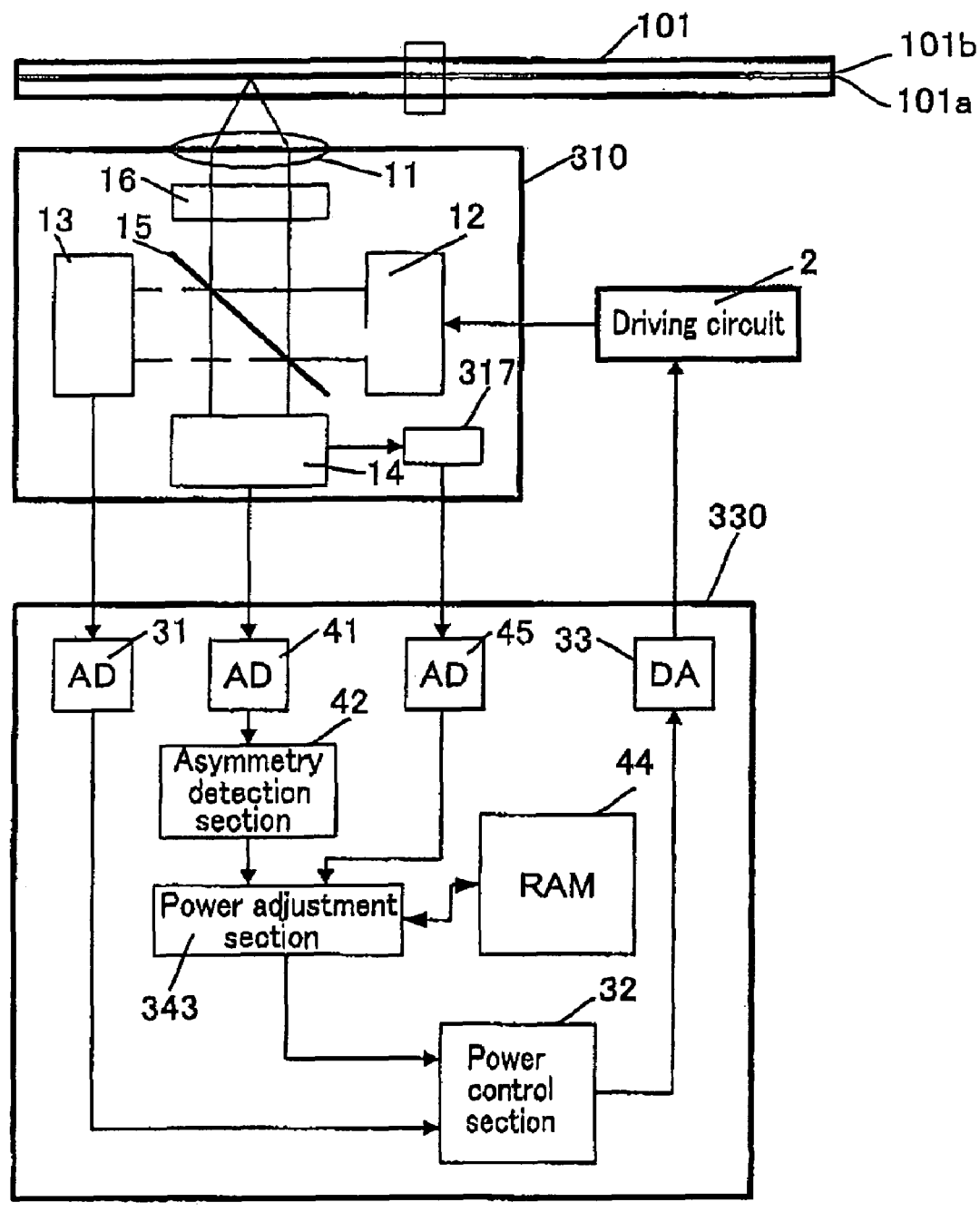
FIG. 8 is a block diagram showing a configuration of an optical disk apparatus according to embodiment 3 of the invention.

FIG. 8 is a block diagram showing a configuration of an optical disk apparatus 300 for recording information onto an optical disk 101.

The optical disk apparatus 300 includes an optical pickup 310 for irradiating the optical disk with a laser beam and a DSP (Digital Signal Processor) 330. The DSP 330 functions as a laser power control apparatus for controlling a power of the laser beam.

A spherical aberration for the optical disk 101 is generated due to unevenness of the thickness of the protection layer (or cover layer) between the recording film and the disk surface of the optical disk 101 and the like. The spherical aberration causes the change in effective power of the laser beam. The purpose of embodiment 3 of the invention is to adjust the effective power of the laser beam depending on the changes in spherical aberration due to unevenness of the thickness of the protection layer (or cover layer) between the recording film and the disk surface of the optical disk 101 and the like.

The operation of the optical disk apparatus 300 will be described below.

The optical pickup 310 converges the laser beam onto the recording film of the first layer 101a, or converges the laser beam onto the recording film of the second layer 101b.

A part of the laser beam emitted from the laser element 12 is transmitted through the reflection plate 15 and is detected by the emitting light detector 13.

Further, the laser beam emitted from the laser element 12 is reflected by the reflection plate 15, is transmitted, through the deflection hologram 16, and is converged onto the recording film (the recording film of the first layer 101a or the recording film of the second layer 101b) of the optical disk 101 by the convergence lens 11.

The laser beam (the reflected light) reflected by the recording film of the optical disk 101 is transmitted through the convergence lens 11, is deflected by the deflection hologram 16, is transmitted through the reflection plate 15 and is detected by the reflected light detector 14.

The optical pickup 310 includes a spherical aberration detector 317 for detecting a spherical aberration based on the distribution of the reflected light detected by the reflected light detector 14.

The laser beam detected by the emitting light detector 13 is analog-to-digital converted by the AD converter 31 included in the DSP 330. The output from the AD converter 31 is supplied to the power control section 32 included in the DSP 330.

The power control section 32 generates a laser driving value such that a power of the laser beam detected by the emitting light detector 13 approaches a control target level, and controls the laser element 12 in accordance with the laser driving value.

Such a control is achieved, for example, by the DA converter 33 included in the DSP 330, which digital-to-analog converts the laser driving value generated by the power control section 32, and supplies the output from the DA converter 33 to the driving circuit 2. The control target level is determined by the power adjustment section 343 and is set in the power control section 32.

The driving circuit 2 drives the laser element 12 in accordance with the output from the DA converter 33.

The laser beam detected by the reflected light detector 14 (i.e. reflected light) is analog-to-digital converted by the AD converter 41 included in the DSP 330. The output from the AD converter 41 is supplied to the asymmetry detection section 42 included in the DSP 330.

The asymmetry detection section 42 detects asymmetry of the reflected light (Ipk+Ibm−2Iavg)/(Ipk−Ibm) from the peak level Ipk, the bottom level Ibm and the average level Iavg, and outputs a signal indicating the asymmetry of the reflected light to the power adjustment section 343.

The power adjustment section 343 searches an optimal value of the power of the laser beam such that the asymmetry of the reflected light becomes a desired value (e.g. "0"), The steps of this search method are the same as those described in embodiment 1 with reference to FIG. 2. Therefore, the detailed description is omitted herein.

The power adjustment section 343 outputs the optimal value of the power of the laser beam to the power control section 32 as the control target level.

Further, the power adjustment section 343 adjusts the power of the laser beam for the recording layer of the first layer 101a (i.e. the reference layer) in accordance with the output from the spherical aberration detector 317.

Figure 9:
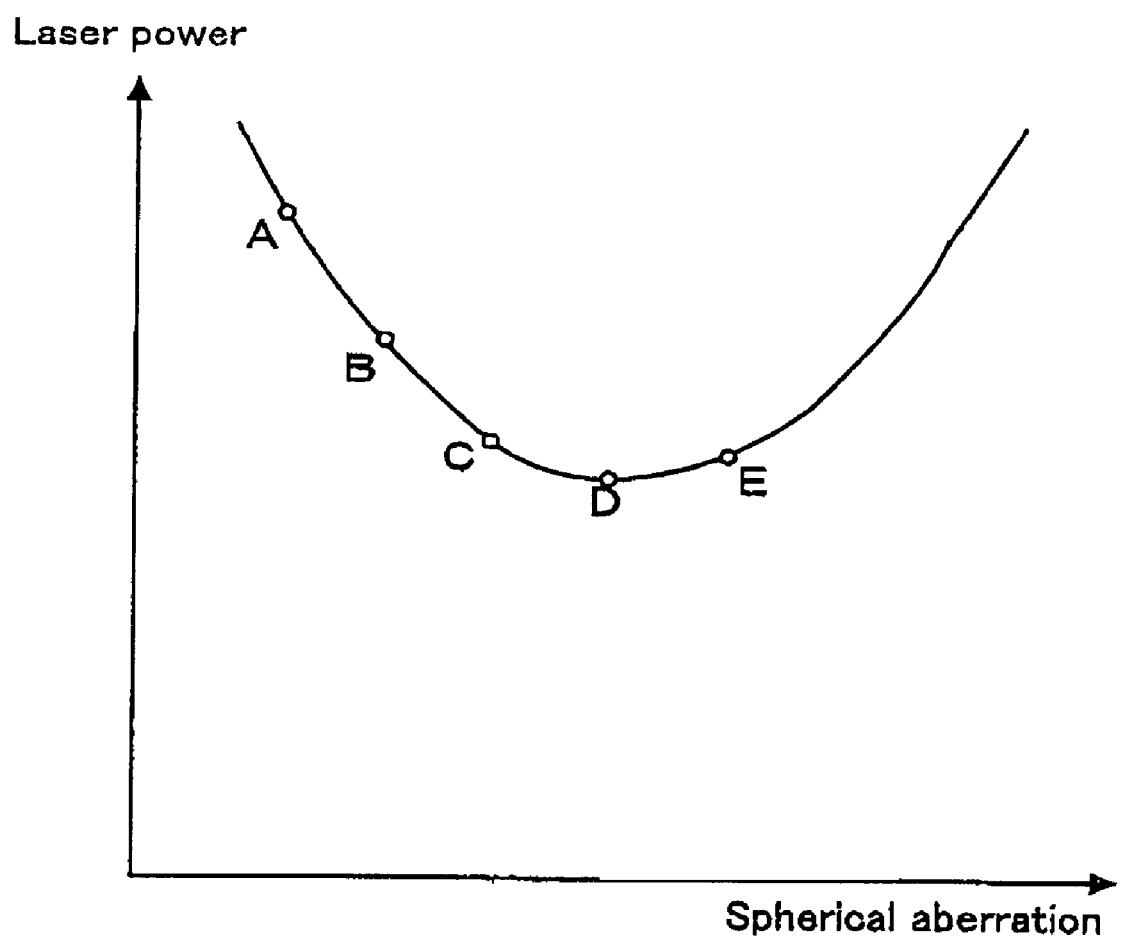
FIG. 9 is a characteristic diagram showing a relationship between the spherical aberration and the power of the laser beam.

FIG. 9 is a characteristic diagram showing a relationship between the spherical aberration and the power of the laser beam. In FIG. 9, the horizontal axis indicates the spherical aberration, and the vertical axis indicates the power of the laser beam. As shown in FIG. 9, an optimal power of the laser beam is changed according to the spherical aberration.

The power adjustment section 343 adjusts the power of the laser beam according to the spherical aberration. For example, it is detected that the spherical aberration is changed in the order of point "A", point "B", point "C", point "D" and point "E" shown in FIG. 9, and the power adjustment section 343 adjusts the power of laser beam for each of the points shown in FIG. 9. As a result, the control target level which has been adjusted by the power adjustment section 343 is stored in the table of RAM 44.

The method for adjusting the power of the laser beam will be described below. This method is performed, for example, by operating the optical disk apparatus 300.

The steps of the method for adjusting the power of the laser beam in the case where the power of the laser beam is adjusted before recording data onto the optical disk 101 is started (i.e. in the case of "initial adjustment") are the same as those described in embodiment 1 with reference to FIG. 3A. Therefore, the detailed description is omitted herein.

Figure 10A:
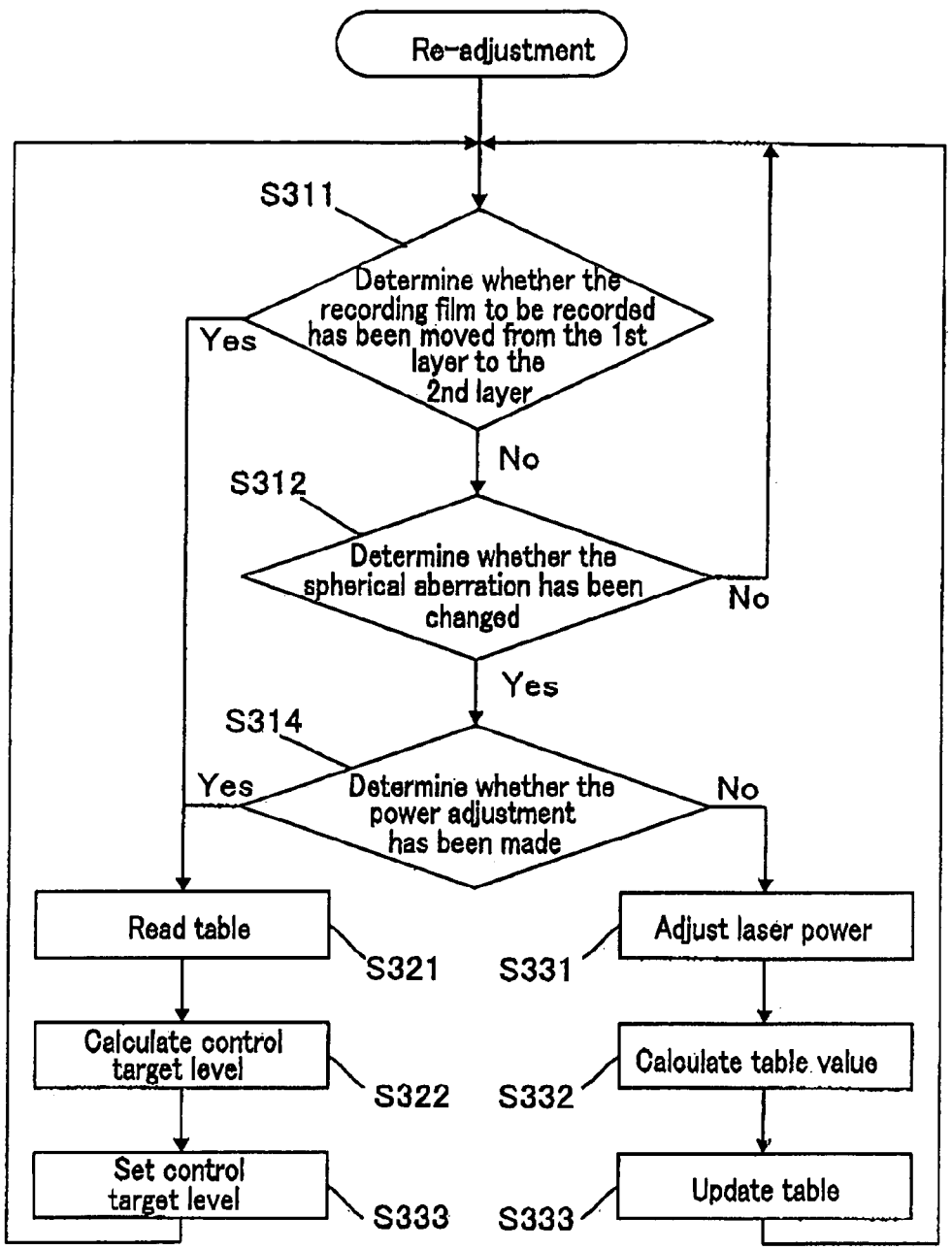
FIG. 10A is a flowchart showing the steps of the method for adjusting the power of the laser beam in the case of the re-adjustment according to embodiment 3 of the invention.

With reference to FIG. 10A, it will be described below, the steps of the method for adjusting the power of the laser beam in the case where the power of the laser beam is adjusted during recording data onto the optical disk 101 due to the changes in spherical aberration and the like, after the initial adjustment (i.e. in the case of "re-adjustment").

It is determined whether the recording film to be recorded has been moved from the recording film of the first layer 101a (the reference layer) to the recording film of the second layer 101b (S311).

If it is determined that the recording film to be recorded has been moved from the recording film of the first layer 101a to the recording film of the second layer 101b, then the power adjustment section 343 reads the ratio Pw2/Pw1 and the current control target level Pw1t for the recording film of the first layer 101a from the table stored in the RAM 44 (S321), calculates the current control target level Pw2t for the recording film of the second layer 101b according to the equation of Pw2t=Pw1t×Pw2/Pw1 (S322), and sets the current control target level Pw2t for the recording film of the second layer 101b which has been calculated in step S322 in the power control section 32 (S323).

When the function of Pw1 (for example, F2(Pw1)) is stored in the RAM 44 instead of the ratio Pw2/Pw1, the power adjustment section 343 reads the function F2 (Pw1) and the current control target level Pw1t for the recording film of the first layer 101a from the table stored in the RAM 44 (S321), and calculates the current control target level Pw2t for the recording film of the second layer 101b according to the equation of Pw2t=F2(Pw1t) (S322).

The current control target level Pw1t for the recording film of the first layer 101a is calculated for the purpose of compensating the changes in the control target level Pw1 due to the changes in spherical aberration.

For example, it is assumed that the control target level Pw1 is a control target level at the reference spherical aberration Z0 μm (corresponding to the thickness of the protection layer (or cover layer) between the recording film and the disk surface of the optical disk 101), the spherical aberration is changed from Z0 μm to Z1 μm, and the spherical aberration correction coefficient $K_S$(Z1 μm) for the current spherical aberration Z1 μm is set to 1.02 (102%). In this case, the current control target level Pw1t is calculated according to the equation of Pw1t=Pw1×$K_S$(Z0 μm)=1.02 Pw1.

The spherical aberration correction coefficient $K_S$ can be stored in the spherical aberration correction table of RAM 44 as a power rate relative to the reference spherical aberration of the reference layer, for example.

FIG. 10B shows an example of the spherical aberration correction table. In this example, the table indicates that $K_S$(Z1 μm)=1.02 (102%) and $K_S$(Z2 μm)=0.98 (98%), both for the reference spherical aberration Z0 μm.

The power adjustment section 343 can read the ratio Pw2/Pw1 which is recorded in a predetermined area (e.g. a predetermined area within the lead-in area) of the optical disk 101, instead of reading the ratio Pw2/Pw1 from the table stored in the RAM 44.

Alternatively, the power adjustment section 343 can read the function of Pw1 (e.g. F2(Pw1)) which is recorded in a predetermined area (e.g. a predetermined area within the lead-in area) of the optical disk 101, instead of reading the function of Pw1 from the table stored in the RAM 44.

Thus, the power adjustment section 343 determines the power of the laser beam for the recording film of the second layer 101b, based on the power of the laser beam which has been adjusted for the recording film of the first layer 101a.

It is determined that the spherical aberration has been changed (S312). The output of the spherical aberration detector 317 is analog-to-digital converted by the AD converter 45 included in the DSP 330. The output of the AD converter 45 is supplied to the power adjustment section 343. The power adjustment section 343 determines whether the spherical aberration has been changed by monitoring the output of the AD converter 45, for example.

If it is determined that the spherical aberration has been changed, then it is determined whether the power of the laser beam for the recording film of the first layer 101a has been adjusted for the current spherical aberration (S314).

Such a determination is made, for example, by determining whether the control target level Pw1 for the recording film of the first layer 101a has been adjusted for the current spherical aberration (i.e. determining whether the current control target level Pw1t for the current spherical aberration (or the spherical aberration correction coefficient $K_S$ for the current spherical aberration) is stored in the RAM 44). The power adjustment section 343 determines whether the control target level Pw1 has been adjusted by retrieving the contents of the RAM 44, for example.

If it is determined that the power of the laser beam for the recording film of the first layer 101a has been adjusted, then the steps S321, S322 and S323 as described above are executed.

If it is determined that the power of the laser beam for the recording film of the first layer 101a has not been adjusted, then the power adjustment is made for the first layer 101a in a similar way as step S101 shown in FIG. 3A (S331).

Such a power adjustment is made, for example, by the power control section 32 controlling the laser element 12 such that the laser beam having the power according to the control target level Pw1', which is preset for the recording film of the first layer 101a, is irradiated towards the optical disk 101, and by the power adjustment section 343 adjusting the control target level for the recording film of the first layer 101a such that the asymmetry of the reflected light from the optical disk 101 becomes a desired value (e.g. "0").

The power adjustment section 343 calculates a value to be stored in the table of the RAM 44 (S332), and updates the table of the RAM 44 using the calculated value (S333).

For example, the power adjustment section 343 may store a set of the current spherical aberration and the control target level which has been adjusted by the power adjustment section 243 (i.e. the control target level for the current spherical aberration) in the RAM 44.

Alternatively, the power adjustment section 243 may calculate the spherical aberration correction coefficient $K_S$ for the current spherical aberration from the control target level at the reference spherical aberration and the control target level which has been adjusted by the power adjustment section 343 (i.e. the control target level for the current spherical aberration), and store a set of the current spherical aberration and the spherical aberration correction coefficient $K_S$ in the RAM 44.

According to the method for adjusting the power of the laser beam mentioned above, by storing table data indicating the power of the laser beam which has been adjusted for each temperature in the RAM 44 included in the DSP 330, the control target level of the power control section 32 can be set based on the table data stored in the RAM 44 without recording/reproducing data, when the table data corresponding to the current spherical aberration exists in the RAM 44.

Further, for an optical disk having a plurality of layers, the control target level for the recording film of each layer other than the reference layer can be set based on a ratio of the control target level for the recording layer for the corresponding layer other than the reference layer to the control target level for the recording film of the reference layer.

Alternatively, a function of the control target level for the recording film for the reference layer can be used instead of such a ratio. The function is, for example, a linear function or a quadratic function.

This enables, for the optical disk having a plurality of layers, to adjust the power of the laser beam for recording, so that a reproduced signal is obtained, such that the asymmetry of the reflected light becomes a desired value (e.g. "0") within the substantially same time required for an optical disk having a single layer, when the power of the laser beam emitted from the laser element is changed, due to the changes in spherical aberration which are caused by unevenness of the thickness of the protection layer (or cover layer) between the recording film and the disk surface of the optical disk 101.

The asymmetry detection section 42 is used to detect an optimal power of the laser beam. The asymmetry detection section 42 can be replaced with any detection section for detecting an optimal power of the laser beam. For example, the asymmetry detection section 42 can be replaced with a modulation degree detection section for detecting a modulation degree of the reflected light from the optical disk 101. The modulation degree detection section detects the modulation degree of the reflected light (Ipk−Ibm)/Ipk from the peak level Ipk and the bottom level Ibm, and outputs a signal indicating the modulation degree of the reflected light to the power adjustment section 43. The power adjustment section adjusts the control target level for the power of the laser beam such that the modulation degree of the reflected light becomes a desired value.

When information is recorded onto an optical disk in accordance with a CAV method which maintains the angular velocity of the optical disk to be constant, the linear velocity of the optical disk is proportional to the position along the radial direction of the optical disk.

Figure 11:
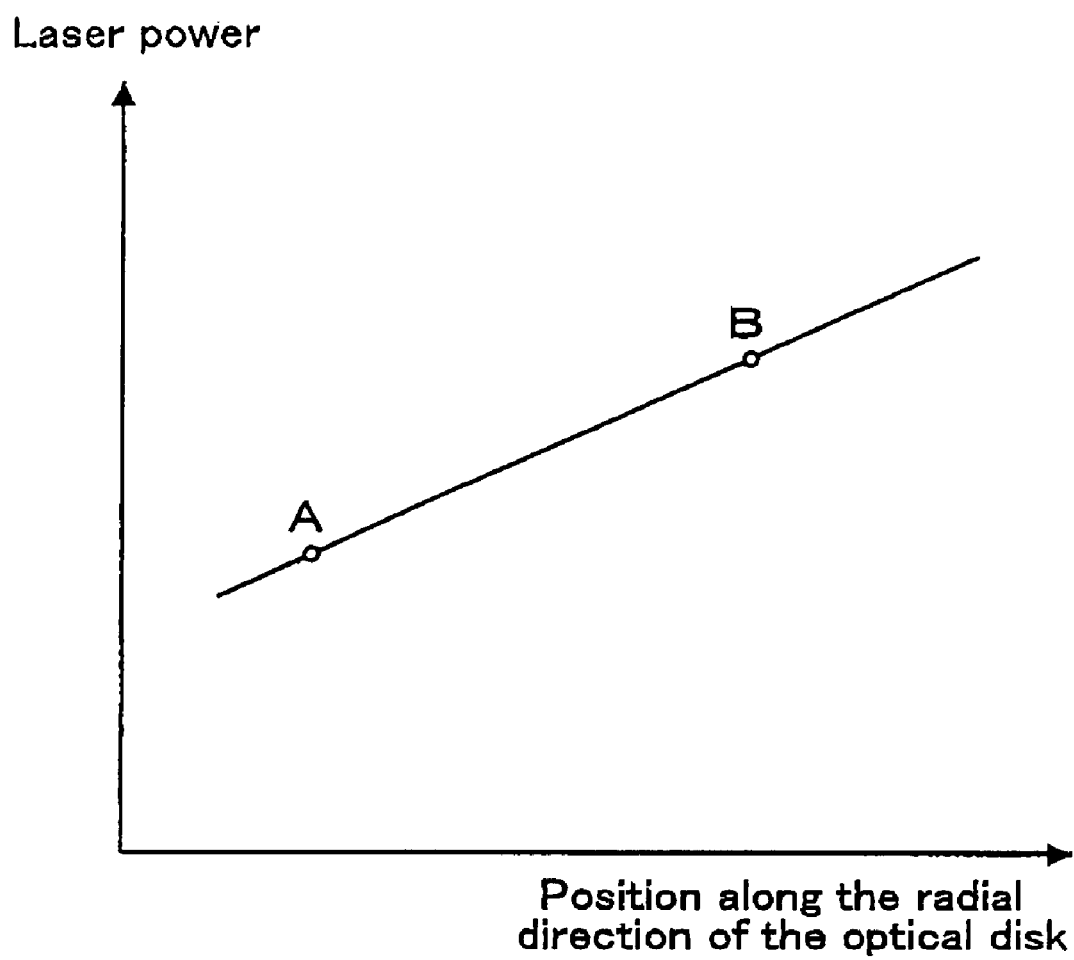
FIG. 11 is a characteristic diagram showing a relationship between the position along the radial direction of the optical disk and the power of the laser beam.
Figure 12:
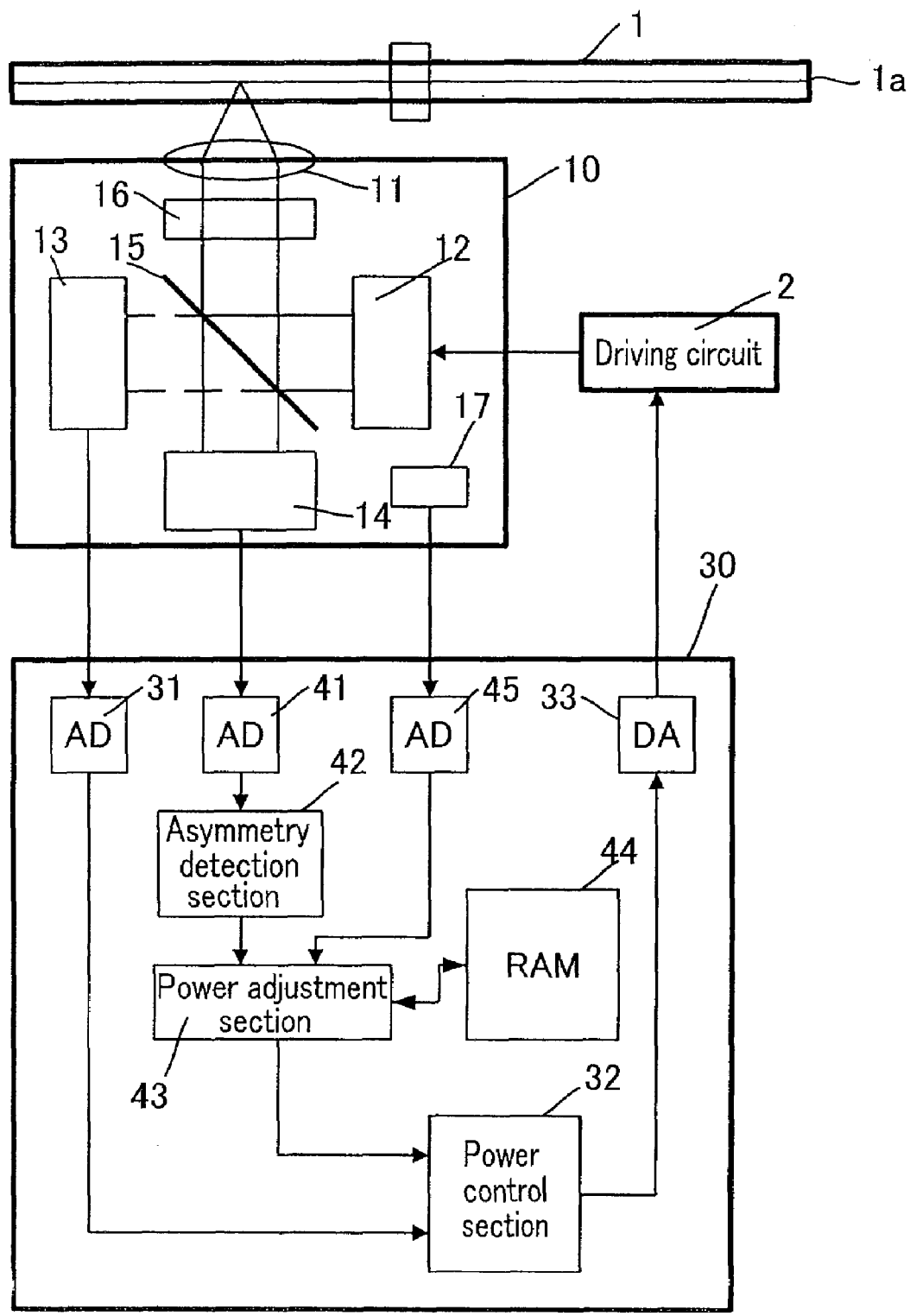
FIG. 12 is a block diagram showing a configuration of a conventional optical disk apparatus.
Figure 13:
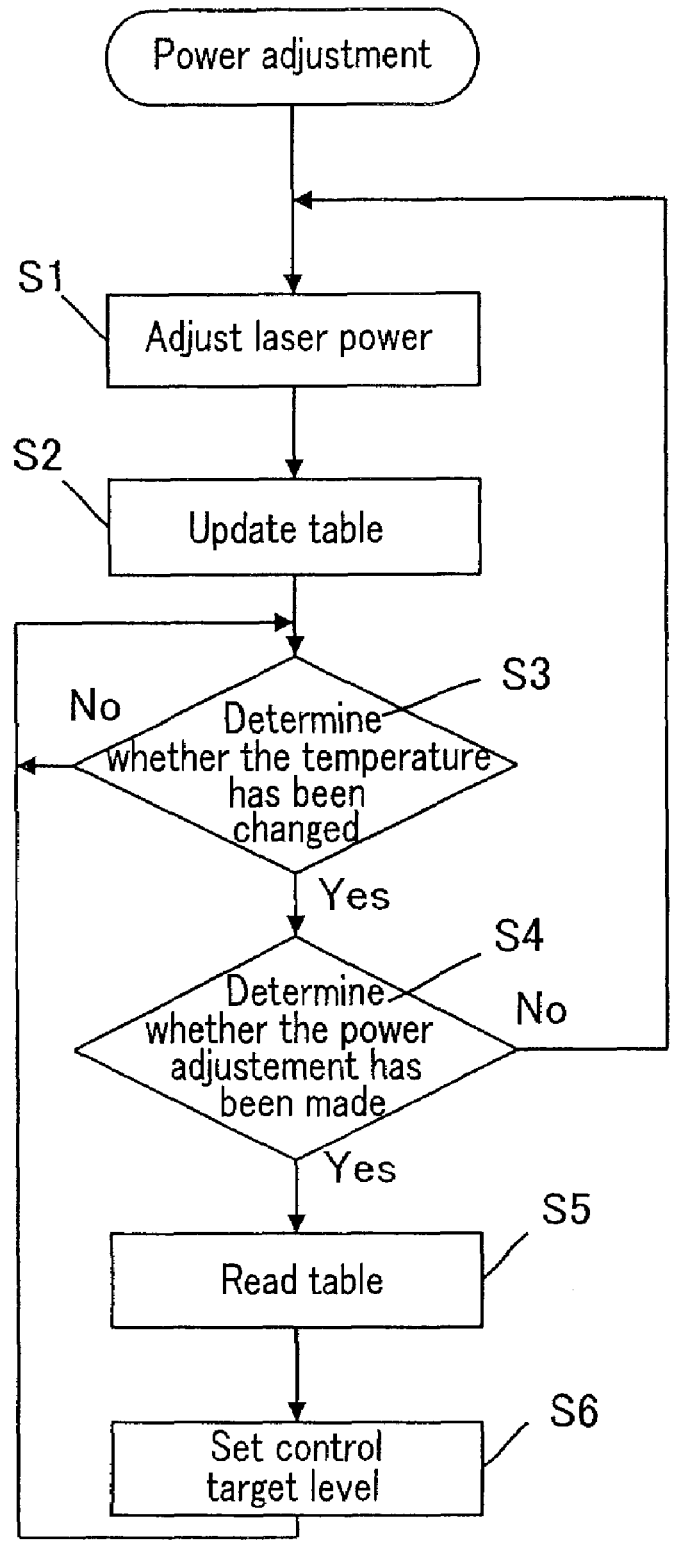
FIG. 13 is a flowchart showing the steps of a conventional method for adjusting the power of the laser beam.

FIG. 11 is a characteristic diagram showing a relationship between the position along the radial direction of the optical disk and the power of the laser beam. In FIG. 11, the horizontal axis indicates the position along the radial direction of the optical disk, and the vertical axis indicates the power of the laser beam.

Since an optimal power of the laser beam is changed depending on the position along the radial direction of the optical disk as shown in FIG. 11, it is necessary to adjust the power of the laser beam at two or more positions along the radial direction of the optical disk, and to store the adjusted result into RAM as well as the position along the radial direction of the optical disk.

For example, it is possible to adjust the power of the laser beam at two points (i.e. point "A" and point "B" shown in FIG. 11) along the radial direction of the optical disk, and to store a characteristic obtained by making a linear approximation to the two points into RAM.

For an optical disk having two layers, it is possible to calculate an optimal power of the laser beam depending on the position along the radial direction of the optical disk for only one reference layer, and to store the calculated optimal power into only one reference layer. Further, it is possible to calculate an optimal power of the laser beam using a power ratio of the laser beam for each layer other than the reference layer. By adjusting the power of the laser beam depending on each position along the radial direction of the optical disk for only one reference layer, the time required for adjusting the power of the laser beam can be reduced. In this case, the power characteristic of the laser beam for the linear velocity can be used instead of the power characteristic of the laser beam for the position along the radial direction of the optical disk.

In embodiments 1 to 3, it is described an exemplary method for adjusting a control target level of the power of the laser beam according to each of the change in temperature, the change in tilt and the change in spherical aberration. However, adjusting a control target level of the power of the laser beam according to the combination of at least two of the change in temperature, the change in tilt and the change in spherical aberration should fall within the scope of the present invention.

For example, DSP 130 (or 230 or 330) can be configured to include a change detection section including at least one of the temperature detector 17 (FIG. 1), the tilt detector 217 (FIG. 5) and the spherical aberration detector 317 (FIG. 8). In this case, the power adjustment section 143 (or 243 or 343) adjusts the control target level for the recording film of the reference layer, based on at least one of the output from the temperature detector 17, the output from the tilt detector 217 and the output from the spherical aberration detector 317.

For, example, it is assumed that the control target level Pw1 is a control target level for the recording film of the reference layer (e.g. the first layer 101a) at the reference temperature X0° C., the reference tilt Y0° and the reference spherical aberration Z0 μm. It is further assumed that the temperature correction coefficient $K_T$(X1° C.) for the current temperature X1° C. is set to 1.01 (101%), the tilt correction coefficient $K_C$(Y1°) for the current tilt Y1° is set to 1.03 (103%) and the spherical aberration correction coefficient $K_S$(Z1 μm) for the current spherical aberration Z1 μm is set to 1.02 (102%). In this case, the control target level Pw1t for the recording film of the reference layer at the current temperature X1° C., the current tilt Y1° and the current spherical aberration Z1 μm is calculated according to the equation of Pw1t=Pw1×$K_T$(X1° C.)×$K_C$(Y1°)×$K_S$(Z1 μm); Pw1×1.01×1.03×1.02.

Further, the control target level Pw2t for the recording film of the layer other than the reference layer (e.g. the second, layer 101b) at the current temperature X1° C., the current tilt Y1° and the current spherical aberration Z1 μm is calculated according to the equation of Pw2t=F2(Pw1)× $K_T$(X1° C.)×$K_C$(Y1°)×$K_S$(Z1 μm)=F2(Pw1)×1.01×1.03× 1.02. Herein, F2(Pw1) denotes a function of Pw1 which is used to determine a control target level for the recording film of a particular layer other than the reference layer (e.g. the second layer 101b).

Thus, using the combination of at least one of the correction coefficients (e.g. $K_T$, $K_C$ and $K_S$) for the reference layer with the inter-layer correction coefficient (e.g. F2(Pw1)) between the reference layer and a particular layer other than the reference layer, the control target level for the recording film of the particular layer other than the reference layer can be calculated. These coefficients can be stored, for example, in a memory such as a RAM in the form of a table.

In embodiments 1 to 3, it is described an exemplary method for adjusting a power of the laser beam for the recording film of the first layer 101a, by adjusting a control target level for the recording film of the first layer 101a. However, the present invention is not limited to this. For example, the power of the laser beam for the recording film of the first layer 101a can be adjusted by adjusting a level of the power of the laser beam detected by the emitting light detector 13. Alternatively, the power of the laser beam for the recording film of the first layer 101a can be adjusted by adjusting a level of the laser driving value. Alternatively, the power of the laser beam for the recording film of the first layer 101*a* can be adjusted by adjusting at least one of a level of the power of the laser beam detected by the emitting light detector 13, the control target level and the level of the laser driving value. Such adjustments are made by the power adjustment section and the results of the adjustments are set in the power control section.

In embodiments 1 to 3, it is described an exemplary optical disk apparatus which irradiates an optical disk with a laser beam from one side of the optical disk. However, the present invention is not limited to this. For example, the present invention can be applied to an optical disk apparatus which irradiates an optical disk with laser beams from both sides of the optical disk.

In embodiments 1 to 3, it is described an exemplary optical disk having a plurality of layers. However, the present invention is not limited to this. For example, the present invention can be applied to a disk exchanger for recording/reproducing one selected from a plurality of optical disks, each having a single layer.

Thus, the present invention is useful as a laser power control apparatus and method for use in an optical disk apparatus for recording information onto an optical disk having a plurality of layers, an optical disk apparatus for recording information onto the optical disk and a recording method for recording information onto the optical disk, and the like.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A laser power control apparatus for use in an optical disk apparatus for recording information on an optical disk having at least a first layer and a second layer, comprising:
   a power control section for controlling a laser element such that a power of a laser beam approaches a control target level;
   a change detection section for detecting that a recording condition for the optical disk has been changed; and
   a power adjustment section for adjusting the power of the laser beam for a recording film of the first layer, in accordance with an output from the change detection section,
   wherein the power adjustment section determines the power of the laser beam for a recording film of the second layer, based on the power of the laser beam which has been adjusted for the recording film of the first layer.

2. A laser power control apparatus according to claim 1, wherein the optical disk apparatus includes an optical pickup for irradiating the optical disk with the laser beam and a driving circuit for driving the optical pickup,
   the optical pickup includes the laser element and an emitting light detector for detecting the laser light emitted from the laser element,
   the power control section generates a laser driving value such that a power of the laser beam detected by the emitting light detector approaches the control target level, and controls the laser element in accordance with the laser driving value, and
   the power adjustment section adjusts the power of the laser beam for the recording film of the first layer by adjusting at least one of a level of the laser beam detected by the emitting light detector, the control target level and a level of the laser driving value.

3. A laser power control apparatus according to claim 1, wherein the power adjustment section determines the control target level for the recording film of the second layer, as a function of the control target level for the recording film of the first layer.

4. A laser power control apparatus according to claim 3, wherein the function is a ratio of the control target level for the recording film of the second layer to the control target level for the recording film of the first layer.

5. A laser power control apparatus according to claim 3, wherein the function is a linear function or a quadratic function.

6. A laser power control apparatus according to claim 3, wherein the function is recorded in a predetermined area of the optical disk.

7. A laser power control apparatus according to claim 1, wherein the optical disk further includes a third layer,
   the power adjustment section further determines the control target level for a recording film of the third layer, as a function of the control target level for the recording film of the first layer,
   the function used in determining the control target level for the recording film of the second layer is different from the function used in determining the control target level for the recording film of the third layer.

8. A laser power control apparatus according to claim 1, wherein the change detection section includes at least one of a temperature detection section for detecting a temperature, a tilt detection section for detecting a tilt between a normal direction of an information surface of the optical disk and an optical axis direction of the laser beam irradiated towards the optical disk, and a spherical aberration section for detecting a spherical aberration of the laser beam due to a thickness of a protection layer of the optical disk,
   the power adjusting section adjusts the power of the laser beam for the recording film of the first layer, based on at least one of an output from the temperature detection section, an output from the tilt detection section and an output from the spherical aberration section.

9. A laser power control apparatus according to claim 1, further comprising:
   an asymmetry detection section for detecting an asymmetry of the laser beam reflected by the optical disk,
   wherein the power adjustment section adjusts the power of the laser beam for the recording film of the first layer such that an output from the asymmetry detection section becomes a desired value.

10. A laser power control apparatus according to claim 1, further comprising:
    a modulation degree detection section for detecting a modulation degree of the laser beam reflected by the optical disk,
    wherein the power adjustment section adjusts the power of the laser beam for the recording film of the first layer such that an output from the modulation degree detection section becomes a desired value.

11. A laser power control apparatus according to claim 1, wherein the power control section controls the laser element in an initial adjustment of the power of the laser beam, such that the power of the laser beam approaches a control target level Pw2' which is preset for the recording film of the second layer,
    the control target level Pw2' is defined based on a control target level Pw1 which has been adjusted for the recording film of the first layer, a level of a reference power Pw1" for the recording film of the first layer, and a level of a reference power Pw21" for the recording film of the second layer, the reference power Pw1" is recorded in a predetermined area of the optical disk, and the reference power Pw2" is recorded in a predetermined area of the optical disk.

12. A laser power control apparatus according to claim 11, wherein the control target level Pw2' is defined by the equation of Pw2'=Pw1×Pw2"/Pw1".

13. A laser power control method for use in an optical disk apparatus for recording information on an optical disk having at least a first layer and a second layer, comprising:

controlling a laser element such that a power of a laser beam approaches a control target level;

detecting that a recording condition for the optical disk has been changed;

adjusting the power of the laser beam for a recording film of the first layer, in accordance with the change of the recording condition; and determining the power of the laser beam for a recording film of the second layer, based on the power of the laser beam which has been adjusted for the recording film of the first layer.

14. An optical disk apparatus for recording information onto an optical disk having at least a first layer and a second layer, comprising:

an optical pickup for irradiating the optical disk with a laser beam;

a driving circuit for driving the optical pick up; and a laser power control apparatus for controlling a power of the laser beam, wherein the laser power control apparatus includes:

a power control section for controlling a laser element such that the power of the laser beam approaches a control target level;

a change detection section for detecting that a recording condition for the optical disk has been changed; and a power adjustment section for adjusting the power of the laser beam for a recording film of the first layer, in accordance with an output from the change detection section, and wherein the power adjustment section determines the power of the laser beam for a recording film of the second layer, based on the power of the laser beam which has been adjusted for the recording film of the first layer.

15. A recording method for recording information onto an optical disk having at least a first layer and a second layer, comprising:

irradiating the optical disk with a laser beam; and controlling a power of the laser beam, wherein the controlling the power of the laser beam includes:

controlling a laser element such that the power of the laser beam approaches a control target level;

detecting that a recording condition for the optical disk has been changed;

adjusting the power of the laser beam for a recording film of the first layer, in accordance with the change of the recording condition; and determining the power of the laser beam for a recording film of the second layer, based on the power of the laser beam which has been adjusted for the recording film of the first layer.

\* \* \* \* \*